United States Patent
Karim et al.

(10) Patent No.: US 8,367,193 B1
(45) Date of Patent: Feb. 5, 2013

(54) AQUEOUS NANOCOMPOSITE DISPERSIONS CONTAINING INVISIBLE MARKER DYE FOR TRANSPARENT BARRIER COATINGS AND PREPARATIONS AND USE THEREOF

(75) Inventors: Douglas P. Karim, Irvine, CA (US); Laxmi Samantara, Edison, NJ (US); Carrie A. Feeney, Bridgewater, NJ (US); Michele Farrell, Bethlehem, PA (US); Harris A. Goldberg, Edison, NJ (US)

(73) Assignee: INMAT Inc, Hillsborough, NJ (US)

( * ) Notice: Subject to any disclaimer, the term of this patent is extended or adjusted under 35 U.S.C. 154(b) by 774 days.

(21) Appl. No.: 12/383,073

(22) Filed: Mar. 19, 2009

Related U.S. Application Data

(60) Provisional application No. 61/070,129, filed on Mar. 20, 2008.

(51) Int. Cl.
  *C08K 3/34* (2006.01)
(52) U.S. Cl. ........ 428/220; 524/446; 524/447; 524/450; 524/791
(58) Field of Classification Search .................... 428/220
  See application file for complete search history.

(56) References Cited

U.S. PATENT DOCUMENTS

| | | |
|---|---|---|
| 4,171,228 A | 10/1979 | Lowrey |
| 4,472,538 A | 9/1984 | Kamigaito et al. |
| 4,889,885 A | 12/1989 | Usuki et al. |
| 4,911,218 A | 3/1990 | Patitsas |
| 5,049,609 A | 9/1991 | Patitsas |
| 5,178,702 A | 1/1993 | Frerking, Jr. et al. |
| 6,087,016 A | 7/2000 | Feeney et al. |
| 6,162,857 A | 12/2000 | Trexler, Jr. et al. |
| 6,232,389 B1 | 5/2001 | Feeney et al. |
| 6,261,631 B1 | 7/2001 | Lomasney |
| 6,410,926 B1 | 6/2002 | Munro et al. |
| 6,488,719 B2 | 12/2002 | Lomasney et al. |
| 2004/0106707 A1* | 6/2004 | Su et al. .................. 524/105 |
| 2005/0187326 A1* | 8/2005 | Nakazawa .................. 524/417 |
| 2005/0214659 A1* | 9/2005 | Andrews et al. .................. 430/7 |
| 2006/0017957 A1* | 1/2006 | Degott et al. .................. 358/1.14 |

(Continued)

FOREIGN PATENT DOCUMENTS

| | | |
|---|---|---|
| JP | 08309262 A * | 11/1996 |
| JP | 11-246729 | 9/1999 |

(Continued)

OTHER PUBLICATIONS

Yano, K. et al., Journal of Polymer Science A: Polymer Chemistry, 35, 2289 (1997); W. J. Ward et al., "Gas Barrier Improvement Using Vermiculite and Mica in Polymer Films", Journal of Membrane Science, 55:173-180 (1991).

(Continued)

*Primary Examiner* — Maria Veronica Ewald
*Assistant Examiner* — Laura Auer
(74) *Attorney, Agent, or Firm* — Michael W. Ferrell

(57) ABSTRACT

The invention relates in one aspect to a post-formulation concentrated nanocomposite dispersion containing an invisible marker dye. The dispersion typically includes a silicate filler and a matrix polymer dispersed in an aqueous medium as well. The dispersions form optically transparent barrier films wherein the dye is effective to indicate film thickness on a substrate. Specific embodiments of this invention include a nanocomposite coating formulation designed to provide transparent high barrier coatings at thicknesses from 1 to 10 microns that include a near infrared (NIR) or infrared (IR) dye that enables rapid measurement of coating thickness and uniformity. The preferred dye imparts no observable color or appearance change, and thus can also function as an identifier for the coating.

41 Claims, 17 Drawing Sheets

U.S. PATENT DOCUMENTS

| | | | |
|---|---|---|---|
| 2006/0251905 A1* | 11/2006 | Arakawa | 428/429 |
| 2006/0269958 A1* | 11/2006 | Lee | 435/6 |
| 2006/0292323 A1* | 12/2006 | Hutchinson et al. | 428/36.91 |
| 2007/0115325 A1* | 5/2007 | Tsubaki | 347/52 |

FOREIGN PATENT DOCUMENTS

WO     WO 2006024103 A1 *   3/2006

OTHER PUBLICATIONS

Wu, Y-P et al., "Structure of Carboxylated Acrylonitrile-Butadiene Rubber (CNBR)-Filler Nanocomposites by Co-coagulating Rubber Latex and Filler Aqueous Suspension", Journal of Applied Polymer Science, 82, 2842-2848 (2001).

Wu, Y-P et al., "Structure and Properties of Nitrile Rubber (NBR)-Filler Nanocomposites by Co-coagulating NBR Latex and Filler Aqueous Suspension", Journal of Applied Polymer Science, 89, 3855-3858 (2003); Varghese and Karger-Kocsis, "Natural rubber-based nanocomposites by latex compounding with layered silicates", Polymer, 1-8 (2003).

Goldberg et al., "Nanocomposite Barrier Coatings for Elastomeric Applications", Materials Research Society, Symposium T: Polymer nanocomposites, paper T4.7, (Apr. 2002); Goldberg et al., "Elastomeric Barrier Coatings for Sporting Goods", ACS Rubber Section, Apr. 29, 2002, paper 17, published in Rubber World, vol. 226, No. 5, p. 15 (Aug. 2002).

* cited by examiner (ABSORBANCE-LINEAR BASELINE)

THICKNESS VS. ABSORBANCE PEAK AREA ON GLASS SLIDE

COMPARISON OF ABSORBANCE SPECTRA OF COATING WITH 20 AND 50 mg/L NIR DYE

COMPARISON OF THICKNESS MEASURED BY SPECTROPHOTOMETER AND PROFILOMETRY METHOD

AQUEOUS NANOCOMPOSITE DISPERSIONS CONTAINING INVISIBLE MARKER DYE FOR TRANSPARENT BARRIER COATINGS AND PREPARATIONS AND USE THEREOF

CLAIM FOR PRIORITY

This non-provisional application claims the benefit of the filing date of U.S. Provisional Patent Application Ser. No. 61/070,129, of the same title, filed Mar. 20, 2008. The priority of U.S. Provisional Patent Application Ser. No. 61/070,129 is hereby claimed and the disclosure thereof is incorporated into this application by reference.

FIELD OF INVENTION

The present invention relates generally to nanocomposite dispersions which are used to provide transparent coatings having enhanced barrier properties featuring an invisible marker dye in the dispersion for improved quality control, security, and manufacturing development. In a preferred embodiment, the invention relates to infrared (IR) or near infrared (NIR) dye containing nanocomposite dispersions which include exfoliated silicate filler, a film forming polymer, a water soluble IR or NIR dye and water. The dispersions are optionally condensed by selectively removing a portion of the aqueous medium. More specifically, the invention relates to a nanocomposite coating formulations designed to provide transparent high barrier coatings at thicknesses from 1-10 microns that include an IR or an NIR dye that enables rapid measurement of coating thickness and uniformity. Even thinner coatings; for example as thin as 0.1 microns could be used in some cases.

BACKGROUND OF THE INVENTION

Barrier coatings which prevent, reduce, or inhibit the permeation of a selected substrate with a gas, vapor, chemical and/or aroma have been widely described, and such coatings are used in a variety of industries, e.g., the packaging industry, automobile industry, paint industry, and tire industry. For example, butyl rubber in automobile tires has been coated with formulations which includes a polymer and a platelet filler, in order to reduce the air permeability of the tire. See, e.g., U.S. Pat. Nos. 4,911,218 and 5,049,609. Tires with integral innerliners are disclosed in U.S. Pat. No. 5,178,702, wherein the tire includes rubber laminate in which at least two layers are barrier layers having 100 parts by weight rubber, 100 parts by weight acrylonitrile/diene polymer and about 25-150 parts by weight of platelet filler of unspecified width and thickness. These compositions are stated to reduce the costs of the innerliners while maintaining flexibility and barrier performance.

The use of exfoliated silicates to produce nanocomposite barrier coatings has been achieved by several methods. The most widely used has been by combining a dissolved polymer with exfoliated filler. Water soluble polymers such as polyvinyl alcohol (PVOH) have been combined with water exfoliated filler such as vermiculite. See, Japanese Patent 11-246729, Sep. 14, 1999, "Gas-Barrier Poly(vinyl alcohol)/poly (acrylic acid) Compositions and their Laminates and Shaped Articles." Sumitomo Chemical Co., Ltd. Polycarbonate polymers have been dissolved in toluene and combined with organically functionalized filler to form good barrier coatings. W. J. Ward et al., "Gas Barrier Improvement Using Vermiculite and Mica in Polymer Films", *Journal of Membrane Science*, 55:173-180 (1991). Other polymers have also been made into improved barrier coatings by dissolving them in a solvent, and using an organically functionalized filler to improve the barrier properties. See, e.g., Yano et al., "Synthesis and Properties of Polyimide-Filler Hybrid Composites", *Journal of Polymer Science A: Polymer Chemistry*, 35, 2289 (1997).

There are several examples of using an aqueous dispersion of exfoliated filler with an aqueous dispersion of polymer to form a nanocomposite. Most of that work used elastomeric polymers in suspension. See, for example, Wu, Y-P et al., "Structure of Carboxylated Acrylonitrile-Butadiene Rubber (CNBR)-Filler Nanocomposites by Co-coagulating Rubber Latex and Filler Aqueous Suspension", *Journal of Applied Polymer Science*, 82, 2842-2848 (2001); Wu, Y-P et al., "Structure and Properties of Nitrile Rubber (NBR)-Filler Nanocomposites by Co-coagulating NBR Latex and Filler Aqueous Suspension", *Journal of Applied Polymer Science*, 89, 3855-3858 (2003); Varghese and Karger-Kocsis, "Natural Rubber-Based Nanocomposites by Latex Compounding with Layered Silicates", *Polymer* (in press) (2003); Feeney et al., U.S. Pat. No. 6,087,016, "Barrier Coating of an Elastomer and a Dispersed Layered Filler in a Liquid Carrier", Jul. 11, 2000; Feeney et al., U.S. Pat. No. 6,232,389, "Barrier Coating of an Elastomer and a Dispersed Layered Filler in a Liquid Carrier and Coated Articles", May 15, 2001; Goldberg et al., "Nanocomposite Barrier Coatings for Elastomeric Applications", *Materials Research Society, Symposium T*: Polymer nanocomposites, paper T4.7, (April 2002); and Goldberg et al., "Elastomeric Barrier Coatings for Sporting Goods", ACS Rubber Section, Apr. 29, 2002, paper 17, published in *Rubber World*, vol. 226, No. 5, p. 15 (August 2002).

There are also examples of pigment containing coating compositions for controlling coating thickness and uniformity. For instance, U.S. Pat. No. 4,171,228 to Lowrey discloses a pigment composition for high build protective coating, which comprises a combination of low density pigments of smooth nodular shape having a particle size of 325 microns with not less than 40 percent by weight retained on a 325 mesh screen and a second pigment having a median particle diameter ranging from 0.5 to 20 microns. The coating material formed therefrom has a minimum dry film thickness of approximately 100 microns per coat.

U.S. Pat. Nos. 6,261,631 and 6,488,719 to Lomasney et al. describe a method for controlling wet film thickness of clear coatings by means of color-dissipating dye. However, the dye as used therein dissipates color ranging from a few hours to a few days, thus may not be suitable for coatings wherein there is a need for clear transparent coating having no color.

U.S. Pat. No. 6,410,926 to Munro et al. discloses a coating with optical taggent, which is used for determining the thickness of a dryable or curable film-forming coating by incorporating a fluorescent component into the coating. The fluorescent component is either a resin solid of the coating, a fluorescent dye or a fluorescent dye attached to a resin solid of the coating. The coating is exposed to ultraviolet or visible light which causes the fluorescent component to fluoresce. The intensity of the fluorescence of the coating is measured and the thickness or weight of the coating is determined from a known mathematical relationship between the fluorescence intensity of the coating when exposed to the light and the thickness or weight of the coating. However, such fluorescent components are generally not suitable for applications in water dispersible coating compositions.

Other references of interest include U.S. Pat. No. 4,472,538 to Kamigaito et al.; U.S. Pat. No. 4,889,885 to Usuki et al.; U.S. Pat. No. 6,087,016 to Feeney et al.; and U.S. Pat. No. 6,232,289 to Feeney et al.

Despite advances in the art, there exists a need for an aqueous coating composition containing a dye for improved quality control and so forth in connection with transparent thin barrier films. Such a coating would be particularly useful in packaging applications among others where the coating thickness of the coated packaging can be measured rapidly and the coating thickness is preferably uniform. There further exists a need for a transparent coating material containing an invisible marker dye that imparts no observable color or appearance change, and thus can also function as a marker to determine if a particular product has used a particular aqueous barrier coating composition.

SUMMARY OF THE INVENTION

According to one aspect of the present invention there is provided an invisible marker dye containing concentrated dispersion for forming a nanocomposite barrier coating on a substrate, where the barrier coating includes (a) a liquid carrier medium which is primarily water, i.e., at least 50 weight percent; (b) an exfoliated silica filler material that is dispersed in the liquid carrier medium; (c) a matrix polymer which is dispersed in the carrier medium; and (d) an aqueous solution of an invisible marker dye. The barrier coating is transparent with respect to visible light and exhibits at least 5-fold reduction in oxygen permeability as compared with a like coating formed of said matrix polymer alone and the invisible marker dye is selected and present in amounts effective to indicate the thickness of the coating and thereby uniformity thereof. The invisible marker dye provides a means to measure the thickness of the film and thereby serves as a means for quality control. Optionally, the thickness of the coatings can be measured in line at a fixed position of the substrate.

Generally, the barrier coatings formed from the dispersion exhibit at least a 5-fold increase in oxygen barrier as compared with a coating formed from the matrix polymer alone; while typically, the barrier coating exhibits an at least 25-fold reduction in oxygen permeability as compared with a coating formed of matrix polymer alone. At least a 50-fold reduction in gas permeability as compared with a coating formed of matrix polymer alone or at least 100-fold reduction in gas permeability as compared with a coating formed of matrix polymer alone is readily achieved. In preferred cases, at least 500-fold reduction in gas permeability as compared with a coating formed of matrix polymer alone or at least 1000-fold reduction in gas permeability as compared with a coating formed of matrix polymer alone is obtained.

The dispersions are optionally concentrated by dispersing the filler material and polymer matrix in the liquid medium, and increasing the solids content of the initial dispersion by selectively removing a portion of the liquid carrier medium and adding dye solution to the concentrate prior to applying the dispersion to the substrate. The method of preparation of the concentrated dispersions imparts structurally unique, albeit not well understood, characteristics and is intended as a feature of the dispersion and coatings, not merely a step in the preparation thereof.

Still further features and advantages of the invention are apparent from the following description.

BRIEF DESCRIPTION OF THE DRAWINGS

The invention is described in detail below with reference to the drawings wherein.

DETAILED DESCRIPTION OF THE INVENTION

Figure 1:
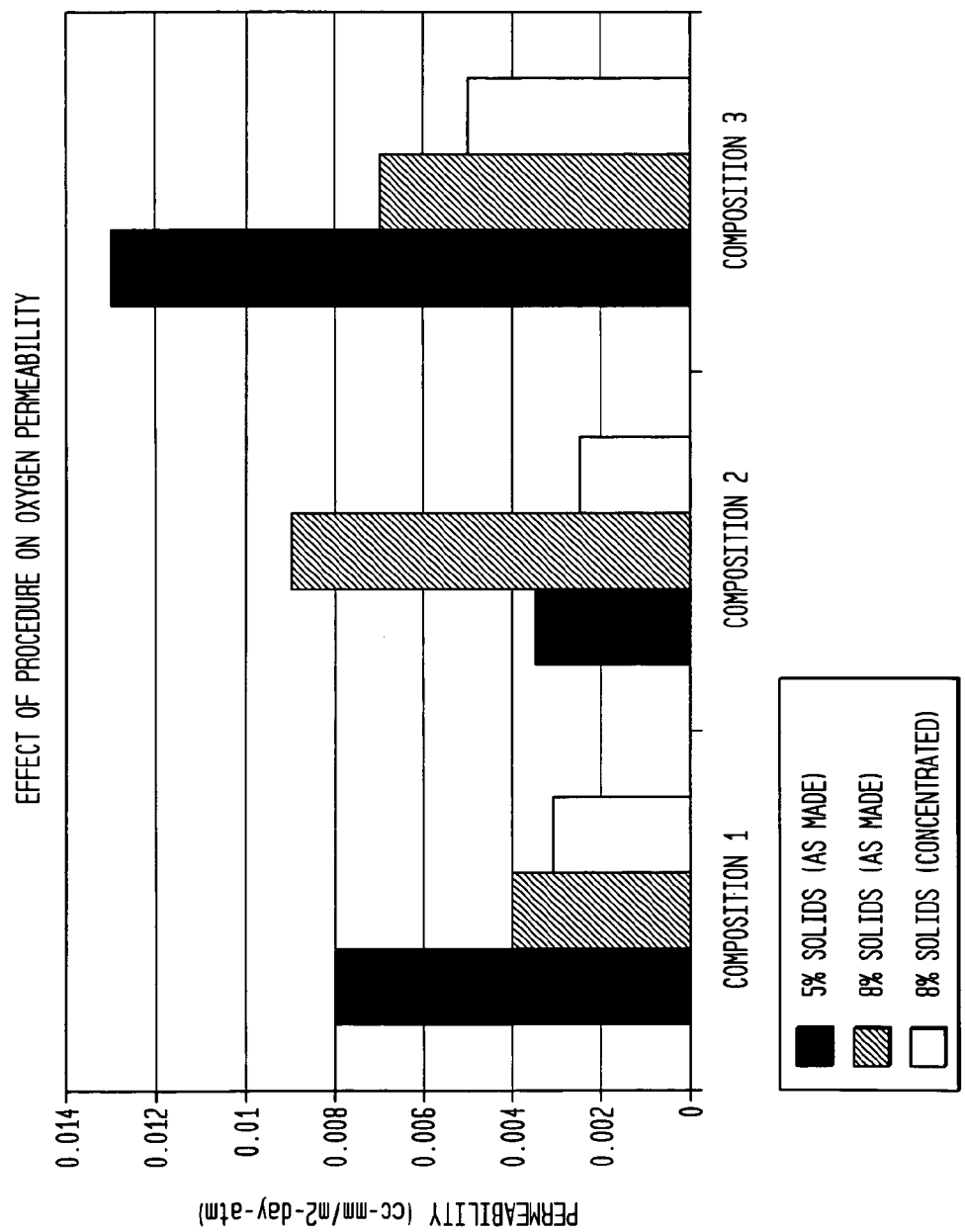
FIG. 1 is a diagram showing the oxygen permeability values of three compositions prepared according to different methods, where it is seen that the concentrated dispersions of the invention have the lowest permeability.

The invention is described in detail below for purposes of illustration only. Modifications within the spirit and scope of the invention, set forth in the appended claims, will be readily apparent to one of skill in the art. Unless defined otherwise, terminology and abbreviations, as used herein, have their ordinary meaning. Following are some exemplary definitions of terms used in this specification and the appended claims.

The phrase "concentrated dispersion," "concentrated nanocomposite dispersion," or like terminology refers to a suspension, dispersion, emulsion, or slurry of exfoliated silicate filler material and a matrix polymer in a liquid carrier medium, where the dispersion is concentrated by removal of a portion of the liquid carrier medium.

The term "nanocomposite" or "filled polymer nanocomposite" refers to the mixture of substantially exfoliated filler and polymer.

The "oxygen transmission rate," or "OTR," of the coatings used in the invention is measured according to ASTM D-3985-02 or any other suitable protocol using a MOCON® OXTRAN 2/20 module and the following conditions: pressure of 1 atm, a temperature of 23° C., and a relative humidity of 0%.

"Oxygen permeability," as used herein, refers to a property of a material that describes the ease with which oxygen gas transmits through a film made of the material. The composite films of the present invention have an oxygen permeability that is at least 10 times less than that of like films (of the same thickness) which contain no filler.

A "barrier coating composition" or "barrier coating mixture" includes a liquid containing suspended solids, which is used to apply the solids to a substrate. This includes a colloidal dispersion, suspension, emulsion and latex as they are conventionally defined. For example, by "colloidal dispersion or latex" is meant any dispersion or suspension of particles in liquid, the particles being of a size greater than molecular scale, e.g., about 0.001 to about 0.1 micron. An emulsion generally contains particles of about 0.05 to 1.0 microns, in liquid. A "suspension" generally contains particles of greater than 1.0 micron in liquid. A novel aspect of the present invention is that the barrier coating compositions provide a better dispersion of exfoliated mineral fillers in liquid at solids content, e.g., between about 5 to about 20 percent solids as described in more detail below. According to this invention, once the "coating mixture" is dried, it is sometimes referred to as a "dried coating" or a "film".

The term "substrate" or "article" coated by these coatings is not particularly limited and may include shaped articles, polymeric films particularly polyester films, polyester blow molded articles or injection molded articles, and cellulosic substrates such as cellulose, cellulose acetate, paper, paperboard, among other substrates. The substrates may be films, corrosion protective films, vacuum and controlled atmosphere packages, blow molded containers, thermoformed containers, and electronic display films among others.

The term "invisible marker dye" is intended to mean a dye substance which is substantially free of absorption maxima at visible wavelengths and preferably exhibits a single strong absorption peak in the near infrared (NIR) to infrared (IR) region. That is, strong absorption in the region of greater than 700 nm to 1200 nm. Preferably invisible marker dye used in connection with this invention is water soluble and forms a homogeneous mixture with the barrier coating composition of this invention. Optionally, the dye may also be soluble in water miscible solvents such as alcohols, e.g., methanol, ethanol or isopropanol, and the like, ketones such as acetone, methyl ethyl ketone, and the like, esters such as ethyl acetate, n-butyl acetate, and the like. Various other polar water miscible solvents can also be employed, such as dimethyl formamide (DMF), N-methylacetamide (NMAC), dimethyl sulfoxide (DMSO), acetonitrile, and the like. The invisible marker dye is generally characterized in that the barrier coating formed is not visually distinguishable from a like coating formed without an invisible marker dye and the dye is effective to indicate the coating thickness throughout the coating by absorption of light outside of the visible spectrum.

The coatings of the invention are transparent in that they freely transmit visible light without imparting color or scattering the light to any substantial degree. In many preferred embodiments, the substrate and coated article are likewise transparent.

The present invention thus relates to invisible marker dye containing nanocomposite coating formulations that include, at a minimum, exfoliated silicate filler material and a matrix polymer which are dispersed in a liquid carrier medium. The coating formulations of the invention are concentrated dispersions which have an unique method of preparation—the silicates and the polymer matrix are dispersed in a liquid carrier medium, and then a portion of the liquid medium is selectively removed from the dispersion, such that the solids content of the dispersion is increased. Preferably the solids content of the initial dispersion is increased by at least 5 percent, more preferably by at least 25 percent and most preferably by 50 percent. A desirable amount of an aqueous solution of an invisible marker dye is then added to this concentrate.

The liquid carrier medium used in the invention is aqueous; that is, it is at least 50 percent water, and typically consists essentially of water. Minor amounts of organic solvents may be included in the carrier medium if desired. Suitable solvents may include ethanol, methanol, isopropanol, n-butyl acetate, ethyl acetate, acetone, methyl ethyl ketone, toluene, hexane, other hydrocarbons, and combinations thereof. Preferably the liquid carrier medium is water free of any other solvents.

The exfoliated silicate filler materials which are dispersed in the liquid carrier medium include layered clay compounds which are made of platelets having a high aspect ratio. "Exfoliation" is defined for layered fillers as the separation of individual layers of the platelet particles; the filler material used in the invention is at least partially exfoliated, and preferably is substantially exfoliated. The aspect ratio is the product of the lateral dimension of a platelet filler particle divided by the thickness of the platelet. The aspect ratio of the filler used in the invention is typically at least 50, at least 1,000, and preferably at least 5,000 up to about 30,000. The thickness of at least some filler particles is below 1 micron, and probably well below 100 nm, preferably less than 10 nm. The exfoliated silicate filler material may include, for example, bentonite, vermiculite, montmorillonite, nontronite, beidellite, volkonskoite, hectorite, saponite, laponite, sauconite, magadiite, kenyaite, ledikite and mixtures thereof. The most preferred fillers are montmorillonite or vermiculite. Suitable montmorillonites are commercially available as SCPX-2973 exfoliated montmorillonite slurry, SCPX-2953 exfoliated montmorillonite solid, and SCPX-2041 exfoliated montmorillonite solid and slurry, all from Southern Clay Products (Gonzales, Tex.).

The silicate filler material may be acid or base pre-treated as is known in the art. The preferred acids for filler pretreatment are selected from acetic acid, glycine and citric acid, and the preferred bases are selected from ammonium hydroxide, sodium hydroxide and potassium hydroxide. The amount of acid or base employed should be in the amount of from about 10% to about 20% by weight of the dried barrier coating.

The exfoliated filler material is present at between about 5 to about 80% by weight of the total solids of the coating formulations, and preferably from 20 to 50 weight percent of the total solids. The compositions of the present invention, when dried, retain the filler in well-dispersed form, resulting in greatly decreased permeability properties.

The matrix polymers useful in the coating formulations of the present invention are not particularly limited. The matrix resins may include homopolymers and/or copolymers, and are dispersed in the liquid carrier medium as an emulsion or latex. The matrix polymer forms a film in the inventive coatings, in which the platelet particles are dispersed to form a nanocomposite barrier coating. The matrix polymer may be present in amounts of from 5 to 80 weight percent of the total solids in the dispersion, preferably from 30 to 60 weight percent.

Non-elastomeric polymers, including polyesters, polyamides, chlorinated polymers, polyolefins, polyurethanes, polyethers, polyketones, polycarbonates, acrylics, vinylics, and fluoropolymers are preferred in many cases. Non-elastomeric polymers are generally considered to be those which have a glass transition temperature of greater than 23° C., and/or those with crystallinity above 10%.

Suitable polymers include polyester resins, such as those which are commercially available as Eastek (Eastman Chemical Company, Kingsport Tenn.). The Eastek polymers are sulfopolyesters with a Tg of from about 30 to 35° C.

Preferred resins include polymers selected generally from among many classes. The selected polymers may be curable polymers, partially cured polymers, or uncured polymers, and are dispersible in water.

In some cases, it may be desirable to use elastomeric or rubbery polymers in the matrix resin. Such polymers include, without limitation, olefinic thermoplastic elastomers; polyamide thermoplastic elastomer; polybutadiene thermoplastic elastomer, e.g., syndiotactic 1,2-polybutadiene thermoplastic elastomer; polyester thermoplastic elastomer; polyurethane thermoplastic elastomer, e.g., thermoplastic polyester-polyurethane elastomer, and thermoplastic polyether-polyurethane elastomer; styrenic thermoplastic elastomer; vinyl thermoplastic elastomer, e.g., polyvinyl chloride polyol (pPVC). Rubbery polymers which may be used include acrylic rubber, such as ethylene-acrylate copolymer; and butadiene rubber, such as polybutadiene. Still other polymers are chlorosulfonated polyethylene rubber, e.g., chlorosulfonated polyethylene; epichlorohydrin rubber, such as polyepichlorohydrin, polyepichlorohydrin copolymer; ethylene-propylene rubber, such as ethylene-propylene copolymer, ethylene-propylene-diene copolymer. Other suitable polymers may include fluoroelastomers, for example, vinylidene fluoride-hexafluoropropylene copolymer; natural rubber; neoprene rubber such as polychloroprene; nitrile rubber, for example, acrylonitrile-butadiene copolymer; polysulfide rubber; polyurethane, for example, polyester urethane, and polyether urethane; propylene oxide rubber; silicone rubber, for example, methylvinylfluorosilicone, and styrene-butadiene rubber, for example, styrene-butadiene copolymer.

The invisible marker dye may be a water soluble infrared (IR) sensitive organic or inorganic or hybrid organic-inorganic compounds. The dye having a strong absorption at a narrow wavelength is particularly preferred. Even more preferably a dye suitable for this invention is having strong absorption in the near infrared (NIR) region of the electromagnetic spectrum, i.e., in the region of 700 nm to 1200 nm, more preferably over the range 750 nm to 1000 nm, and most preferably over the range 750 nm to 850 nm. As already noted above water soluble invisible marker dye is preferred, however, a dye soluble in other water miscible solvents may also be suitable in this invention.

Examples of such NIR dyes are disclosed in JOEM Handbook 2 Absorption Spectra of Dyes for Diode Lasers, Matsuoka, Ky., Bunshin Shuppan, 1990 and Chapter 2; 2.3 of Development and Market Trend of Functional Coloring Materials in 1990's, CMC Editorial Department, CMC, 1990, such as polymethine type coloring material, a phthalocyanine type coloring material, a dithiol metallic complex salt type coloring material, an anthraquinone type coloring material, a triphenylmethane type coloring material, an azo type dispersion dye, and an intermolecular CT coloring material. The representative examples include N-[4-[5-(4-dimethylamino-2-methylphenyl)-2,4-pentadienylidene]-3-methyl-2-,5-cyclohexadiene-1-ylidene]-N,N-dimethylammonium acetate, N-[4-[5-(4-dimethylaminophenyl)-3-phenyl-2-pentene-1-ylidene]-2,5-cyc-lohexadiene-1-ylidene]-N,N-dimethylammonium perchlorate, bis(dichlorobenzene-1,2-dithiol)nickel (2:1)tetrabutyl-ammonium and polyvinylcarbazol-2,3-dicyano-5-nitro-1,4-naphthoquinone complex. Some specific commercial products that may be employed include Pro-jet 830NP, a modified copper phthalocyanine from Avecia of Blackley, Lancashire in the U.K., and ADS 830A, an infra-red absorbing dye from American Dye Source Inc. of Montreal, Quebec, Canada. Other examples of NIR dyes include 2,4,5,7-tetranitrofluorenone or (2,4,7-trinitrofluorenylidene)-malononitrile, which are described in U.S. Pat. No. 7,323,889, which is incorporated herein by reference in its entirety.

Water soluble NIR dyes are particularly preferred. Some specific water soluble commercial products that may be employed include SDA 1910 (Abs. Max. 910 nm), SDA 6122 (Abs. Max. 868 nm), SDA 1868 (Abs. Max. 868 nm), SDA 8700 (Abs. Max. 844 nm), SDA 8208 (Abs. Max. 824 nm), SDB 4927 (Abs. Max. 822 nm), SDA 9362 (Abs. Max. 820 nm) SDA 7563 (Abs. Max. 819 nm), SDA 9158 (Abs. Max. 808 nm), SDA 1842 (Abs. Max. 807 nm), SDB 8662 (Abs. Max. 784 nm), SDA 1372 (Abs. Max. 782 nm) and SDD5712 (Abs. Max. 781 nm) from HW Sands Corp. SDA 8700 and SDB 4927 are particularly preferred.

SDB-4927 is an infrared-absorbing dye, namely 2-(2-(2-chloro-3-(2-(1,3-dihydro-1,1-dimethyl-3-(4-sulfobutyl)-2H-benz[e]indol-2-ylidene)ethylidene)-1-cyclohexene-1-yl) ethenyl)-1,1-dimethyl-3-(4-sulfobutyl)-1H-benz[e] indolium, inner salt, free acid having CAS No. [162411-28-1], available from H. W. Sands Corp., Jupiter, Fla. It has absorption maximum: 822 nanometers (in methanol), extinction coefficient 240,000 L/(mol·cm), melting point: 253-255 degrees Celsius (decomposition), solubility: 30 mg/mL (in methanol), appearance: dark green powder, molecular weight of about 827 grams per mole, and is synonomous with 2-[2-[2-(Chloro-3-[2-(1,3-dihydro-1,1-dimethyl-3-(4-sulfobutyl)-2H-benz[e]indol-2-ylidene)ethylidene]-1-cyclohexen-1-yl]ethenyl]-1,1-dimethyl-3-(4-sulfobutyl-1H-benz[e] indolium, inner salt, free acid, CAS No: 162411-28-1.

SDA-5802 is an infrared-absorbing dye, 2-[2-[2-(2-pyrimidinothio)-3-[2-(1,3-dihydro-1,1-dimethyl-3-(4-sulfobutyl)-2H-benz[e]indol-2-ylidene)]ethylidene-1-cyclo penten-1-yl]ethenyl]-1,1-dimethyl-3-(4-sulfobutyl)-1H-benz[e] indolium, inner salt, sodium salt, having molecular formula C41H47N4NaO6S3 and molecular weight of about 811 grams per 30 mole, available from H. W. Sands Corp., Jupiter, Fla. See http://www.patentstorm.us/patents/6881526-description.html; http://www.freepatentsonline.com/20050214659.html.

It is particularly preferred that the invisible marker dye used in connection with this invention has strong single absorption peak in the NIR or IR region, preferably in the NIR region of the electromagnetic spectrum. More preferably, the invisible marker dye of this invention is substantially free of color thus imparting no color to the coating compositions of this invention. It is even more preferred that the invisible marker dye of this invention forms a transparent film when used with the coating compositions of this invention. Generally, the dye is present in the dispersion in an amount of at least 5 mg/liter, such as in an amount of at least 5 mg/liter and up to 100 mg/liter. In some cases, the dye is present in the dispersion in an amount of at least 10 mg/liter and up to 50 mg/liter.

The barrier coating formulations of the invention may optionally employ at least one or more than one suitable surfactant to reduce surface tension, and aid in dispersion. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried barrier coating uncompromised by residual surfactant. In the event of an unfavorable interaction of the anionic emulsifier present in the latex dispersion, additional ionic additives should be kept to a minimum. This variable is eliminated where the surfactant or emulsifier is non-ionic. Increase in ionic concentration of the compositions, such as by the addition of a base to adjust pH, e.g., KOH, $NH_4OH$ and NaOH, may cause agglomeration of the filler, which adversely affects permeability reduction.

Desirable surfactants may include SURFYNOL JOEM Handbook 2, Absorption Spectra of Dyes for Diode Lasers, Matsuoka, Ky., Bunshin Shuppan, 1990 PSA 336 (Air Products, Inc.), SILWET® L-77 (OSI Specialties, Inc.), and ZONYL® FSP and 8952 (DuPont Performance Chemicals and Intermediates). The amount and number of surfactants added to the coating composition will depend on the particular surfactant(s) selected, but should be limited to the minimum amount of surfactant that is necessary to achieve wetting of the substrate while not compromising the performance of the dried barrier coating. For example, typical surfactant amounts can be less than or equal to about 15% by weight of the dried barrier coating.

The dispersions may also include additional additives such as biocides, colloidal dispersants, anti-foaming agents, dispersing agents, wetting agents, leveling agents, and thickeners. Other optional components of the coating mixture include conventional agents to adjust pH, such as bases, e.g., $NH_4OH$, NaOH or KOH; or acids, e.g., acetic acid, citric acid or glycine provided that care is taken to avoid agglomeration, as discussed above.

As noted above, the dispersions of the invention are produced according to a method whereby the silicate filler and polymer component are dispersed in the liquid medium at a given concentration, and this initial dispersion is subsequently condensed by selectively removing a portion of the liquid carrier medium. In the condensing step, a portion of the liquid carrier medium is selectively removed to increase the solids content of the dispersion. Suitable removal methods include evaporation, distillation, and the like. The liquid may be evaporated off by heating; preferably at a temperature of from about 80° C. to about 100° C. for about 70 to about 100 minutes while stirring until about 1% to about 30% of the liquid carrier evaporates.

The dispersions are typically condensed such that the solids content of the dispersion increases by at least 5%, i.e., has a solids content of at least 1.05 times that of the initial, unconcentrated dispersion. More preferably, enough liquid is removed such that the solids content increases by at least 25% or at least 50%. The concentrated dispersion generally includes from about 5 to 25 weight percent solids, and preferably from about 7 to 15 weight percent solids. Before it is concentrated, the dispersion typically includes from about 3 to 7 weight percent solids. It is unexpected that the dispersion may be concentrated by evaporation without causing the formulation to gel. For example, many silicate filler materials, such as montmorrillonite, form gels at relatively low solids content, and the solids content of the silicate component often limits the final solids content of the barrier coating.

The invisible marker dye is then added to the concentrated dispersion. The dye in desirable amount is dissolved in water and if desired further diluted to the desirable concentration. Then the aqueous dye solution is added to the concentrated dispersion while stirring in order to obtain well dispersed dye containing concentrated dispersion.

The coating formulations of the invention are generally applied to a substrate and dried to form a low permeability barrier coating. The coating films that are produced provide an excellent gas barrier. Generally, the coatings produced according to the invention exhibit a reduction in oxygen permeability of at least 100-fold as compared to a similar barrier coating which does not include silicate filler material. More preferably, the barrier coating produced according to the present invention exhibits at least a 200-fold, at least a 400-fold, and even more than 900-fold reduction in gas permeability as compared to a barrier coating which does not include the silicate filler material. Suitable permeability values for the coating may be less than 0.02 cc-mm/$m^2$-day-atm, or less than 0.01 cc-mm/$m^2$-day-atm. It should further be noted that addition of dye solution to concentrated dispersion does not compromises the barrier properties of the resulting dye containing dispersion, which aspect becomes even more apparent from the specific Examples that are described in more detail below.

Furthermore, it has been surprisingly discovered according to the present invention that coatings which were made from concentrated dispersions, i.e. condensed, exhibit superior oxygen barrier properties as compared with a like coating (same composition and thickness) which is prepared from a like dispersion that did not undergo selective removal of the liquid carrier medium, i.e., a dispersion that is prepared by adding the filler material at higher solids content in polymer latex, without subjecting the dispersion to substantial evaporation or other liquid removal. Remarkably, the barrier properties of the invention are superior to uncondensed formulations, even where the solids content and composition are the same. As compared to films formed from dispersions which did not undergo an evaporation step, the inventive coatings exhibit permeability values that are at least 10 percent, and preferably at least 20 percent lower.

In addition to reduced gas permeability, the high solids coating formulation produced in accordance with the present invention provides a product with reduced drying times, higher viscosity and thus thicker dip coated samples in a single step, better suspension stability, reduced shipping costs, thicker spray coatings without dripping, reduced penetration of coating into substrate porosity and defects, and thicker coating in continuous film and paper coating applications.

Another non-limiting advantage of this invention is that the use of an invisible marker dye in coatings compositions of this invention provides transparent high barrier coatings at thicknesses from 1-10 microns that include an NIR or IR dye that enables rapid measurement of coating thickness and uniformity. Preferably, the invisible marker dye of this invention imparts no observable color or appearance change, and thus can also function as a security marker to determine if a product has used barrier coatings of this invention, and how much has been used.

Additionally, in an embodiment of this invention, the coatings of this invention can be continuously coated on to a substrate and the thickness of coating may be measured continuously inline at a fixed position of the substrate and at a fixed wavelength at which place the dye exhibits a strong absorption. Thus, in accordance with the method of this invention in a given coating system, preferred dye in the coating produces an absorption which increase with thickness over the probable thickness range of coating in a uniform manner. It is even more preferred that the increase be reproducible and capable of representing thickness as a function of intensity of absorption. Most preferably, the relationship between the thickness of the coating and the absorption intensity is linear. It is further evident from the Examples that follow, such coating compositions containing an invisible marker dye can be readily formed for the purpose of controlling coating thickness in an inline setting.

The substrate used with the inventive coatings is not particularly limited and may include polymer substrates including polymeric films and sheets such as polyester films and sheets, elastomeric substrates, and cellulosic substrates such as cellulose, cellulose acetate, paper, paperboard, among other substrates. The substrates may be films, corrosion protective films, vacuum and controlled atmosphere packages, blow molded containers or thermoformed containers, and electronic display films among others.

According to another aspect of the invention, there is provided an article with an oxygen barrier coating layer, said article comprising: a) a substrate; and b) a barrier coating layer adhered to the substrate, where the barrier coating layer includes an exfoliated silicate filler material, a matrix polymer and an invisible marker dye as described herein.

According to yet another aspect of this invention there is further provided a substrate with an oxygen barrier coating layer containing an invisible marker dye for controlling and measuring thickness. In this aspect of the invention, the substrate is selected from the group consisting of polymeric film, cellulosic material, glass plate and blow molded container. The substrate is then coated with a barrier coating layer adhered to the substrate, where the barrier coating layer includes an exfoliated silicate filler material, a matrix polymer and a water soluble invisible marker dye as described herein.

According to another aspect of the invention, there is provided a method of producing an article of manufacture with a barrier coating film containing an invisible marker dye of this invention, including (a) preparing an aqueous dispersion which includes a matrix polymer and an exfoliated silicate filler material; (b) concentrating the dispersion by evaporating water therefrom, such that the solids content of the dispersion increases by 5 percent; (c) adding an aqueous solution of an invisible marker dye; (d) applying a layer of the concentrated dispersion containing the dye to a substrate; (e) drying the concentrated dispersion to produce a barrier coating film which has a permeability that is at least 200 times lower than a like coating film that is prepared without the silicate filler material; and (f) measuring the intensity of the absorption of the film in the NIR region and thereby calculating the thickness of the film by a mathematical equation correlating to the intensity of absorption to the thickness of the film.

Suitable articles for the barrier coatings of the present invention include films, containers and the like, as aforesaid.

The coatings of the invention are particularly suitable for use in packaging material, whereby the barrier coating is applied to a polymeric film substrate; or a blow-molded, thermoformed or injection molded container; a paperboard substrate, and is used to package goods which are sensitive to gases such as oxygen, for example, food, drinks, electronic components, pharmaceuticals, and the like.

EXAMPLES

In the following examples, nanocomposite barrier coating compositions are prepared and applied to polyester substrates and glass plates and then are tested for oxygen transmission rate. The nanocomposite barrier coating films are prepared in an aqueous medium with a polyester resin (Eastek 1000, Eastman, 30% polymer solids) as the polymer matrix and montmorrillonite (SCPX-2973, SCPX-2953, or SCPX-2041) as the exfoliated silicate filler.

EXPERIMENTAL PROCEDURES

Oxygen Transmission Rate (OTR) Testing

Films and coated substrates are tested for oxygen transmission rate using a Mocon® OXTRAN 2/20 or 2/60 module at 23° C., 0% RH, and 1 atm. The samples are loaded onto the modules and conditioned for 2 hours prior to testing for oxygen. Once equilibrium is reached, an OTR is reported in units of cc/m$^2$ day atm.

Thickness Measurements

All thickness calculations are based on the weight of the coating, and an assumed density. For the purposes of the present invention, the density for the polymer phase is assumed to be 0.95 gm/cc in all cases, even though it is recognized that each polymer has a different density. The density of the nanocomposite was estimated using a rule of mixtures, and an assumed density of the clay of 2 gm/cc.

The thickness of the coating on a substrate is measured after the OTR is reported. Each sample is removed from the Mocon module and a circle of specified size is cut from the sample. The cut circle is weighed. The weight of the coating is obtained from subtracting the weight of the uncoated circle, and the thickness calculated from the size of the circle and weight of the coating. For coating thickness less than 5 microns, the thickness is measured using an optical profilometer. The thickness of the film is reported in millimeters and used to calculate the permeability of the film.

The permeability of the coatings is calculated as follows:

$$\text{Permeability of barrier coating} = \frac{X_1}{[(1/OTR) - (X_2/P_{X2})]}$$

where $X_1$ is the barrier coating thickness; $X_2$ is substrate thickness, $P_{x2}$ is permeability of the substrate, and OTR is oxygen transmission rate measured for the barrier coating. The reduction in permeability is calculated as follows:

$$\text{Reduction in permeability} = \left[1 - \frac{\text{Permeability of a barrier coating prepared according to the inventive method}}{\text{Permeability of a barrier coating prepared by other method}}\right] \times 100\%$$

The benefit of obtaining the permeability of the coating versus the OTR of the sample is that permeability reports the OTR at a specified thickness. Therefore, coatings with different thicknesses can be compared directly. OTR units are cc/m² day at 1 atmosphere, 0% relative humidity at 23° C.

Example 1A

5% Solids Polyester Nanocomposite Using SCPX-2973 Montmorillonite Slurry

In an 8 oz jar, 0.02 grams of Acusol® 880 (35.2%, Rohm & Haas), 0.05 grams of Acusol® 882 (17.1%, Rohm & Haas) and 41.54 grams of distilled water were weighed. A stir bar was added and the solution was stirred until the Acusol materials were dissolved. To this solution was added a mixture of 5.65 grams of polyester latex (Eastek 1000, Eastman) and 1 drop of Surfynol® PSA 336 (Air Products, 100%). The resulting solution was mixed thoroughly.

To the above solution, 14.25 grams of montmorillonite SCPX-2973 slurry (9.21% silicate filler) was mixed with 3.49 grams of glycine (Lab Safety Supply, 20% glycine by weight) and 10 grams of distilled water. The resulting solution was stirred with a stir bar for 1 hour and 1 drop of Mergal® 680 (Troy Chemical Corporation, 26.3% by weight anti-microbial) was added. The percent solids of the formulation were measured as 5.0%, using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 11.9 cc/m² day @ 1 atmosphere, 0% RH, 23° C. Permeability of the 0.5 micron polyester nanocomposite is 0.008 cc mm/m² day atmosphere @ 0% RH, 23° C. The reduction in permeability of this coating is 337 times the reduction in permeability of a coating made from the unfilled polyester latex.

Example 1B

8% Solids Polyester Nanocomposite Using SCPX-2973 Montmorillonite Slurry

In an 8 oz jar, 0.04 grams of Acusol® 880 (35.2%, Rohm & Haas), 0.08 grams of Acusol® 882 (17.1%, Rohm & Haas) and 37.4 grams of distilled water were weighed. A stir bar was added and the solution was stirred until the Acusol® materials were dissolved. To this solution was added a mixture of 9.0 grams of polyester latex (Eastek 1000, Eastman) and 1 drop of Surfynol® PSA 336 (Air Products, 100%). The resulting solution was mixed thoroughly.

To the above solution, 22.8 grams of montmorrillonite SCPX-2973 slurry (9.21%) was mixed with 5.59 grams of glycine (Lab Safety Supply, 20%). The resulting solution was stirred with a stir bar for 1 hour and 1 drop of Mergal® 680 (Troy Chemical Corporation, 26.3%) was added. The percent solids of the formulation were measured as 8.1% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 6.1 cc/m² day @ 1 atmosphere, 0% RH, 23° C. Permeability of the 0.6 micron polyester nanocomposite is 0.004 cc mm/m² day atmosphere @ 0% RH, 23° C. The reduction in permeability of this coating is 675 times the reduction in permeability of a coating made from the unfilled polyester latex.

Example 1C

8% Solids Polyester Nanocomposite Using SCPX-2973 Montmorillonite Slurry Concentrated from Example 1A 50 grams of the nanocomposite from Example 1A was placed in an 8 oz. jar. The jar with the lid removed was then placed into a water bath at 95° C. for 90 min while stirring. The internal temperature of the formulation was maintained at 75° C. After the allotted time, the formulation was removed from the water bath and stirred overnight with the lid replaced. The percent solids of the concentrated formulation were measured as 8.3% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 5.0 cc/m² day @ 1 atmosphere, 0% RH, 23° C. Permeability of the 0.6 micron polyester nanocomposite is 0.003 cc mm/m² day atmosphere @ 0% RH, 23° C. The reduction in permeability of this coating is 900 times the reduction in permeability of a coating made from the unfilled polyester latex. The permeability is also 25% lower than the dispersion that was prepared at a target solids content of 8%.

Example 2A

5% Solids Polyester Nanocomposite Using SCPX-2953 Montmorillonite Solid

In a 16 oz jar, 0.05 grams of Acusol® 880 (35.2%, Rohm & Haas), 0.1 grams of Acusol® 882 (17.1%, Rohm & Haas) and 78.9 grams of distilled water were weighed. A stir bar was added and the solution was stirred until the Acusol materials were dissolved. To this solution was added a mixture of 11.3 grams of polyester latex (Eastek 1000, Eastman) and 2 drop of Surfynol® PSA 336 (Air Products, 100%). The resulting solution was mixed thoroughly.

To the above solution, 2.63 grams of montmorillonite SCPX-2953 solid (100%) was mixed with 6.98 grams of glycine (Lab Safety Supply, 20%) and 50 grams of distilled water. The resulting solution was stirred with a stir bar for 1 hour and 2 drops of Mergal® 680 (Troy Chemical Corporation, 26.3%) was added. The percent solids of the formulation were measured as 4.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 6.5 cc/m$^2$ day @ 1 atmosphere, 0% RH, 23° C. Permeability of the 0.5 micron polyester nanocomposite is 0.004 cc mm/m$^2$ day atmosphere @ 0% RH, 23° C. The reduction in permeability of this coating is 675 times the reduction in permeability of a coating made from the unfilled polyester latex.

Example 2B

8% Solids Polyester Nanocomposite Using SCPX-2953 Montmorillonite Solid

In an 8 oz jar, 0.04 grams of Acusol® 880 (35.2%, Rohm & Haas), 0.09 grams of Acusol® 882 (17.1%, Rohm & Haas) and 38.16 grams of distilled water were weighed. A stir bar was added and the solution was stirred until the Acusol® materials were dissolved. To this solution was added a mixture of 9.0 grams of polyester latex (Eastek 1000, Eastman) and 1 drop of Surfynol® PSA 336 (Air Products, 100%). The resulting solution was mixed thoroughly.

To the above solution, 2.1 grams of montmorillonite SCPX-2953 solid (100%) was mixed with 5.59 grams of glycine (Lab Safety Supply, 20%) and 20 grams of distilled water. The resulting solution was stirred with a stir bar for 1 hour and 1 drop of Mergal® 680 (Troy Chemical Corporation, 26.3%) was added. The percent solids of the formulation were measured as 7.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 11.5 cc/m$^2$ day @ 1 atmosphere, 0% RH, 23° C. Permeability of the 0.6 micron polyester nanocomposite is 0.009 cc mm/m$^2$ day atmosphere @ 0% RH, 23° C. The reduction in permeability of this coating is 300 times the reduction in permeability of a coating made from the unfilled polyester latex.

Example 2C

8% Solids Polyester Nanocomposite Using SCPX-2953 Montmorillonite Solid Concentrated from Example 2A 50 grams of the nanocomposite formulation of Example 2A was placed in an 8 oz. jar. The jar with the lid removed was then placed into a water bath at 95° C. for 90 min while stirring. The internal temperature of the formulation was maintained at 75° C. After the allotted time, the formulation was removed from the water bath and stirred overnight with the lid replaced. The percent solids of the formulation was measured as 7.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 3.0 cc/m$^2$ day @ 1 atmosphere, 0% RH, 23° C. Permeability of the 0.6 micron polyester nanocomposite is 0.002 cc mm/m$^2$ day atmosphere @ 0% RH, 23° C. The reduction in permeability of this coating is 1350 times the reduction in permeability of a coating made from the unfilled polyester latex. The permeability is also 78% lower than the dispersion that was prepared at a target solids content of 8%.

Example 3A

5% Solids Polyester Nanocomposite Using SCPX-2041 Montmorillonite Solid

In a 16 oz jar, 0.05 grams of Acusol® 880 (35.2%, Rohm & Haas), 0.1 grams of Acusol® 882 (17.1%, Rohm & Haas) and 78.94 grams of distilled water were weighed. A stir bar was added and the solution was stirred until the Acusol materials were dissolved. To this solution was added a mixture of 11.3 grams of polyester latex (Eastek 1000, Eastman) and 2 drop of Surfynol® PSA 336 (Air Products, 100%). The resulting solution was mixed thoroughly.

To the above solution, 2.63 grams of montmorillonite SCPX-2041 solid (100%) was mixed with 6.98 grams of glycine (Lab Safety Supply, 20%) and 50 grams of distilled water. The resulting solution was stirred with a stir bar for 1 hour and 2 drops of Mergal® 680 (Troy Chemical Corporation, 26.3%) was added. The percent solids of the formulation were measured as 5.0% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 17.1 cc/m$^2$ day @ 1 atmosphere, 0% RH, 23° C. Permeability of the 0.5 micron polyester nanocomposite is 0.013 cc mm/m$^2$ day atmosphere @ 0% RH, 23° C. The reduction in permeability of this coating is 207 times the reduction in permeability of a coating made from the unfilled polyester latex.

Example 3B

8% Solids Polyester Nanocomposite Using SCPX-2041 Montmorillonite Solid

In an 8 oz jar, 0.04 grams of Acusol® 880 (35.2%, Rohm & Haas), 0.09 grams of Acusol® 882 (17.1%, Rohm & Haas) and 38.16 grams of distilled water were weighed. A stir bar was added and the solution was stirred until the Acusol materials were dissolved. To this solution was added a mixture of 9.02 grams of polyester latex (Eastek 1000, Eastman) and 1 drop of Surfynol® PSA 336 (Air Products, 100%). The resulting solution was mixed thoroughly.

To the above solution, 2.1 grams of montmorillonite SCPX-2041 solid (100%) was mixed with 5.59 grams of glycine (Lab Safety Supply, 20%) and 20 grams of distilled water. The resulting solution was stirred with a stir bar for 1 hour and 1 drop of Mergal® 680 (Troy Chemical Corporation, 26.3%) was added. The percent solids of the formulation were measured as 7.8% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 9.7 cc/m$^2$ day @ 1 atmosphere, 0% RH, 23° C. Permeability of the 0.6 micron polyester nanocomposite is 0.007 cc mm/m$^2$ day atmosphere @ 0% RH, 23° C. The reduction in permeability of this coating is 386 times the reduction in permeability of a coating made from the unfilled polyester latex.

Example 3C

8% Solids Polyester Nanocomposite Using SCPX-2041 Montmorillonite Solid Concentrated from Example 3A 50 grams of the nanocomposite formulation from Example 3A was placed in an 8 oz. jar. The jar with the lid removed was then placed into a water bath at 95° C. for 90 min while stirring. The internal temperature of the formulation was maintained at 75° C. After the allotted time, the formulation was removed from the water bath and stirred overnight with the lid replaced. The percent solids of the formulation were measured as 9.0% using standard techniques.

After this coating solution is applied to a polyester film substrate and allowed to dry, the coating contains 45.4% by weight polyester, 35.1% by weight filler, 18.7% glycine, 0.3% Surfynol® PSA 336 wetting agent, 0.2% by weight Acusol® 880, 0.2% by weight Acusol® 882 and 0.05% by weight Mergal® 680 anti-microbial agent.

The oxygen transmission rate (OTR) is measured using a MOCON® OX-TRAN 2/20 module. The OTR is 7.5 cc/m$^2$ day @ 1 atmosphere, 0% RH, 23° C. Permeability of the 0.6 micron polyester nanocomposite is 0.005 cc mm/m$^2$ day atmosphere @ 0% RH, 23° C. The reduction in permeability of this coating is 540 times the reduction in permeability of a coating made from the unfilled polyester latex. The permeability is also 28% lower than the dispersion that was prepared at a target solids content of 8%.

The permeability data for Examples 1A through 3C are outlined in Table 1, below.

TABLE 1

Summary of Results

| Example | Oxygen Permeability (cc mm/m2 day atm @ 23 C., 0% RH) | | |
|---|---|---|---|
| | 5% solid | 8% as made | 8% concentrated |
| Ex. 1A-1C SCPX-2973 slurry | 0.008 | 0.004 | 0.003 |
| Ex. 2A-2C SCPX-2953 solid | 0.0035 | 0.009 | 0.0025 |
| Ex. 3A-3C SCPX-2041 solid | 0.013 | 0.007 | 0.005 |

The above results are further illustrated in FIG. 1, where it can be seen that for each composition, the 8% concentrated dispersions of the invention achieved the best barrier properties. This is surprising because, aside from the method of preparation, one would think that the composition and structure would be substantially identical to those which were prepared at an 8% solids level. Moreover, the improvement is dramatic, with the concentrated dispersions providing coatings which have permeability values which are 20% lower than the 8% as-made composition, and in some instances show improvements of more than 70%.

While the foregoing Examples describe some preferred nanocomposites for use in connection with the present invention, the following copending patent applications and issued patents, the disclosures of which are incorporated herein by reference, provide further details and examples of suitable composites and coated articles: U.S. patent application Ser. No. 11/901,192, filed Sep. 14, 2007, entitled "Concentrated Aqueous Nanocomposite Dispersions for Barrier Coatings"; U.S. patent application Ser. No. 11/272,351 (United States Patent Application Publication No. US 2006-0110615), filed Nov. 10, 2005, entitled "Multilayer Nanocomposite Barrier Structures"; U.S. patent application Ser. No. 11/113,349 (United States Patent Application Publication No. US 2005-0228104), filed Apr. 22, 2005, entitled "Barrier Coating Mixtures Containing Non-Elastomeric Acrylic Polymer With Silicate Filler and Coated Articles", now U.S. Pat. No. 7,473,739 issued Jan. 6, 2009; U.S. patent application Ser. No. 10/741,741 (United States Patent Application Publication No. US 2007-0213446 A1), filed Dec. 19, 2003, entitled "Barrier Coating of a Non-Elastomeric Polymer and a Dispersed Layered Filler in a Liquid Carrier and Coated Articles"; U.S. Pat. No. 7,119,138, issued Oct. 10, 2006, entitled "Barrier Coating of a Mixture of Cured and Uncured Elastomeric Polymers and a Dispersed Layered Filler in a Liquid Carrier and Coated Articles", to Feeney et al.; and U.S. Pat. No. 7,078,453, issued Jul. 18, 2006, entitled "Barrier Coating of a Non-Butyl Elastomer and a Dispersed Layered Filler in a Liquid Carrier and Coated Articles", to Feeney et al.

It has been found in accordance with the present invention that invisible marker dyes, that is, those which exhibit strong absorbency outside of the visible spectrum (i.e., at wavelengths less than 400 nm or greater than 700 nm) can be used to measure thickness of certain nanocomposite barrier coatings without adversely impacting optical properties of the products with respect to visible light. To this end, nanocomposite coating compositions were prepared as described above, except that an invisible marker dye was added to the aqueous dispersion prior to applying the coating composition to a substrate. Details appear below.

Example 4

Thickness Correlation Using Near Infrared (NIR) Dye

Two dyes, SDA 8700 and SDB 4927, were purchased from H.W. Sands Corp., and were screened as markers for thickness measurement. Specimens similar to those of Example 3C containing the SDB 4927 dye (35 percent filler material with 8 percent total solids and containing 20 mg/L dye concentration) for different dipping times to get a range of thicknesses. Absorbance spectra were measured at different points on glass slides in an Evolution 300 spectrometer. Thicknesses on glass slides were measured using Optical Profilometry. Absorbance spectra and film thickness were measured at the same region of the glass slides. The two measurements average over different size and shaped areas. The absorbance peak area calculated using a polynomial fit to the background base line showed the best correlation with thickness with a linear trend (with regression, $R^2$=0.93) compared to peak height and peak areas using a linear baseline. The dye is also stable in formulation for minimum of eight weeks as further described in detail below.

Example 4A

Preparation of Aqueous Dye Solution

Figure 2:
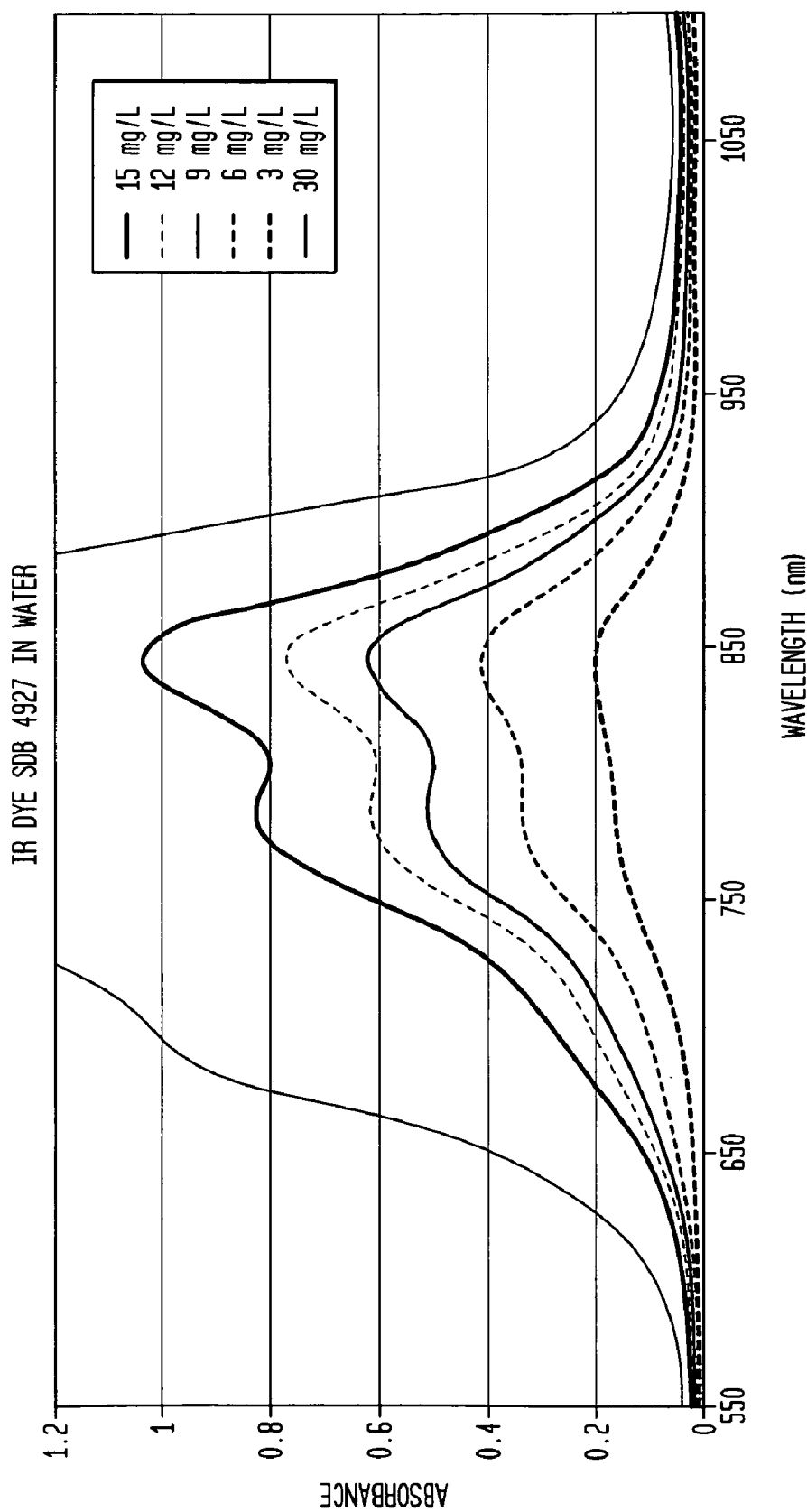
FIG. 2 is an absorbance spectrum of different concentrations of SDB 4927 invisible marker dye in water.
Figure 3:
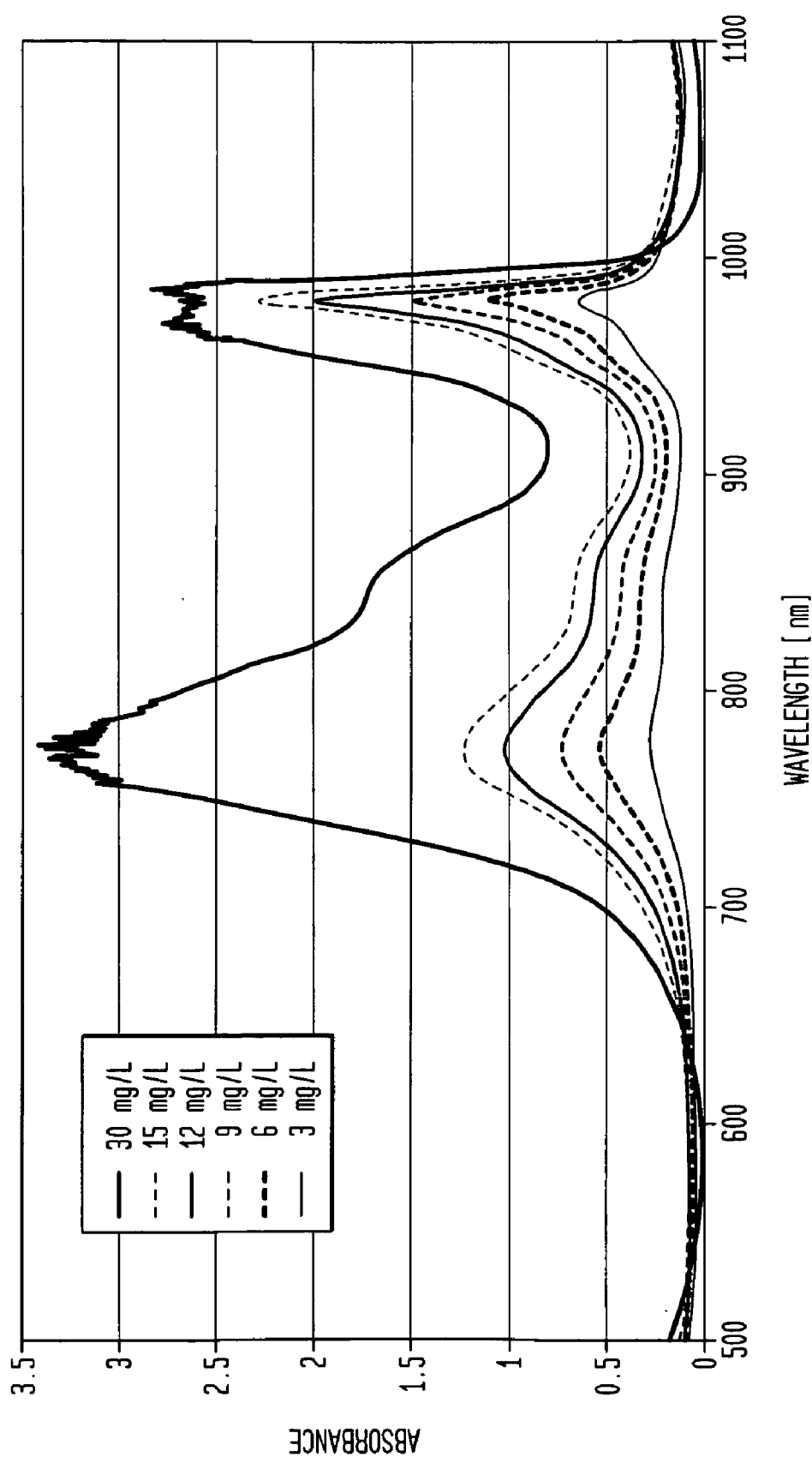
FIG. 3 is an absorbance spectrum of different concentrations of SDA 8700 invisible marker dye in water.
Figure 4:
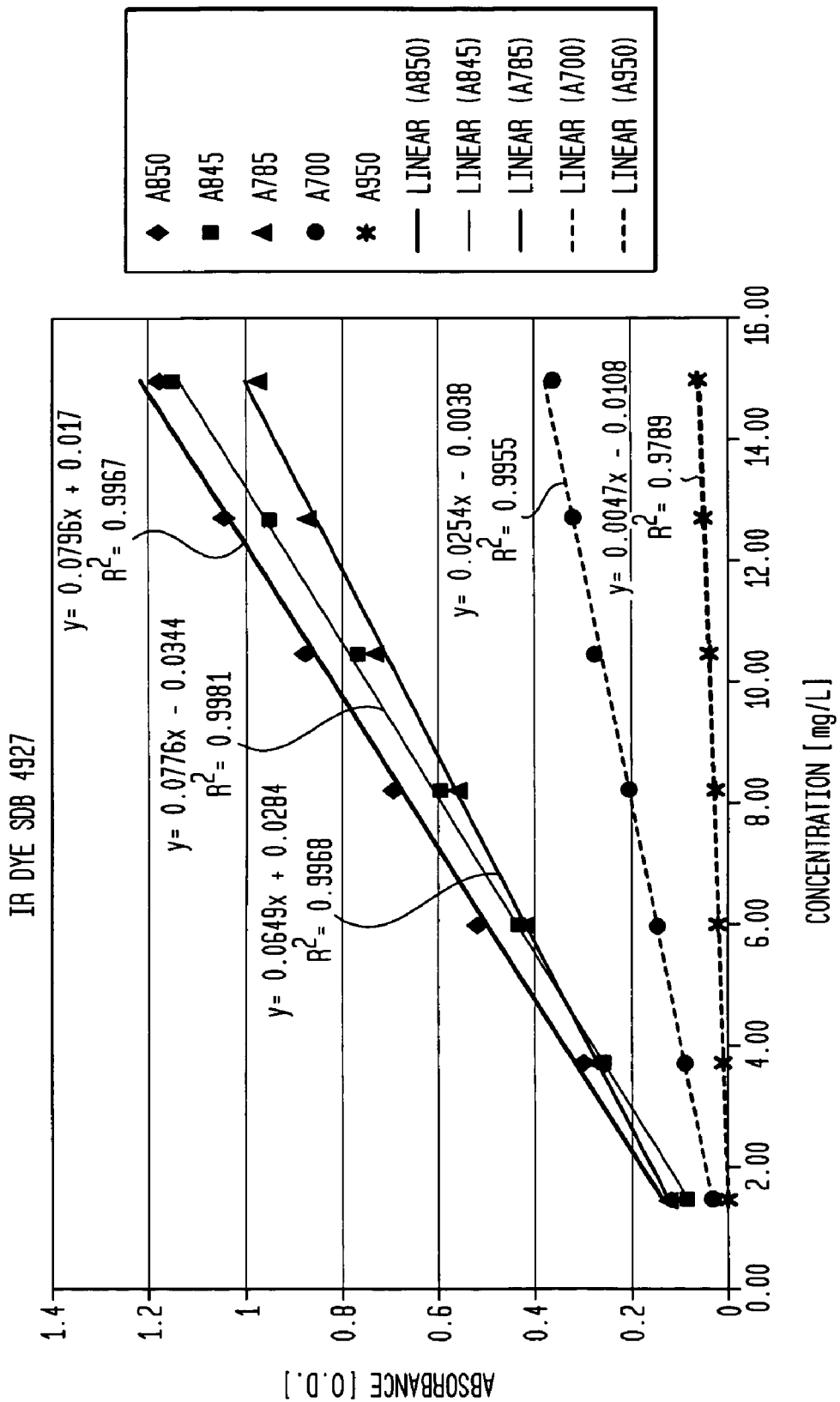
FIG. 4 is an absorbance at different wavelength for various concentrations of SDB 4927 invisible marker dye in water, which shows a linear trend within the measured concentration range.

The dye samples were dissolved in water to form a master batch containing a dye concentration of 10 mg/100 mL and diluted as needed to obtain a series of aqueous SDB 4927 and SDA 8700 solution samples. The absorbance spectra of these solutions were measured from 500 to 1100 nm. FIG. 2 and FIG. 3 respectively show the absorbance spectra of different concentrations of SDB 4927 and SDA 8700. As it is apparent from these figures for all of the concentration range studied, the nature of the peak remained same. The highest intensity peak was observed at 846 nm for SDB 4927. Absorption followed linear trend with dye concentration with regression, $R^2=0.99$ as shown in FIG. 4. A broader absorbance peak was observed for SDA 8700 dye. Comparatively narrow absorbance peak was observed for SDB 4927 dye in the near infrared region.

Example 4B

Preparation of Dye Containing Barrier Coating Compositions

Compositions similar to Example 3C were used in this Example 4B. A measured amount of SDB 4927 dye (NIR dye powder) was added to the nanocomposite formulation in a plastic bottle and stirred using magnetic stirrer for approximately 16 hrs. Two samples of coating compositions containing SDB 4927 dye at concentrations of 10 mg/100 mL and 10 mg/L were prepared. Similarly, two additional samples of coating compositions containing SDA 8700 at concentrations of 10 mg/100 mL and 10 mg/L were also prepared.

Films were prepared of all four formulations on 1 mil PET film and the oxygen transmission rate (OTR) was tested. The intent was to determine if there was any effect of the dye on the barrier property of the formulation. OTR of films with the starting formulation was also run. All barrier coatings can be considered as the same thickness within experimental error. The results are tabulated in Table 2. The results clearly demonstrate that the dye does not affect the oxygen transmission rate.

TABLE 2

Summary of Results

| Formulation | Dye | Concentration mg/L | OTR cc/m2 day atm @ 23 C., 0% RH | |
|---|---|---|---|---|
| Control | none | 0 | 1.9 | 1.0 |
| 1 | SDB4927 | 10 | 1.5 | 0.9 |
| 2 | SDB4927 | 100 | 1.5 | 1.5 |
| 3 | SDA8700 | 10 | 2.0 | 1.4 |
| 4 | SDA8700 | 100 | 1.8 | 1.3 |

Figure 5:
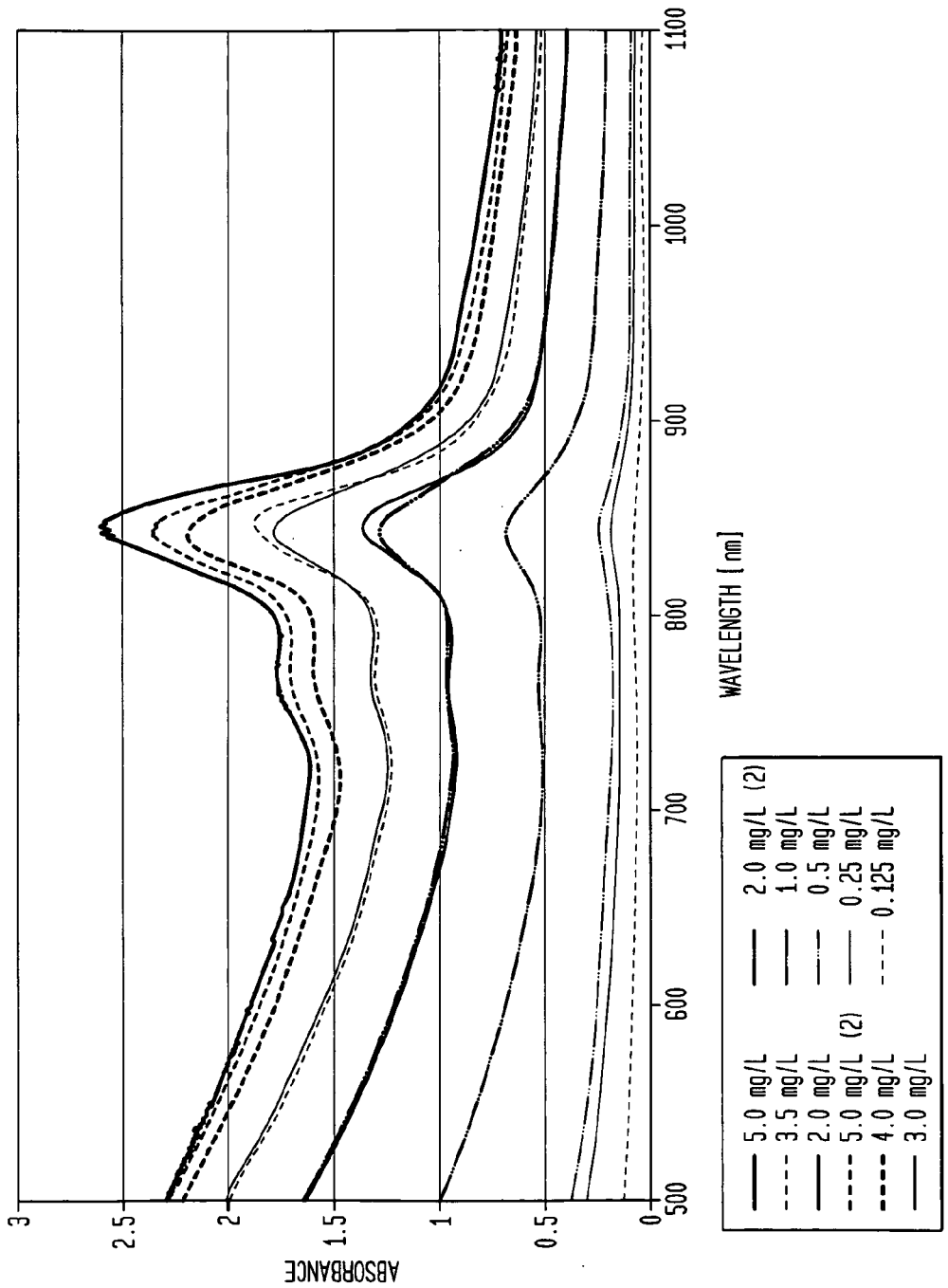
FIG. 5 is an absorbance spectra of SDB 4927 dye containing barrier coating composition of Example 4 (8 weight percent total solids with 10 mg/L of SDB 4927 dye resulting in 35 weight percent of montmorillonite in the dried coating) diluted in water to various concentration.

The SDB 4927 dye containing formulations were then diluted to various concentrations and absorption spectra were taken and is shown in FIG. 5. It is evident from this figure that the nature of the peak remained same as in FIG. 2 and the peak did not shift.

Figure 6:
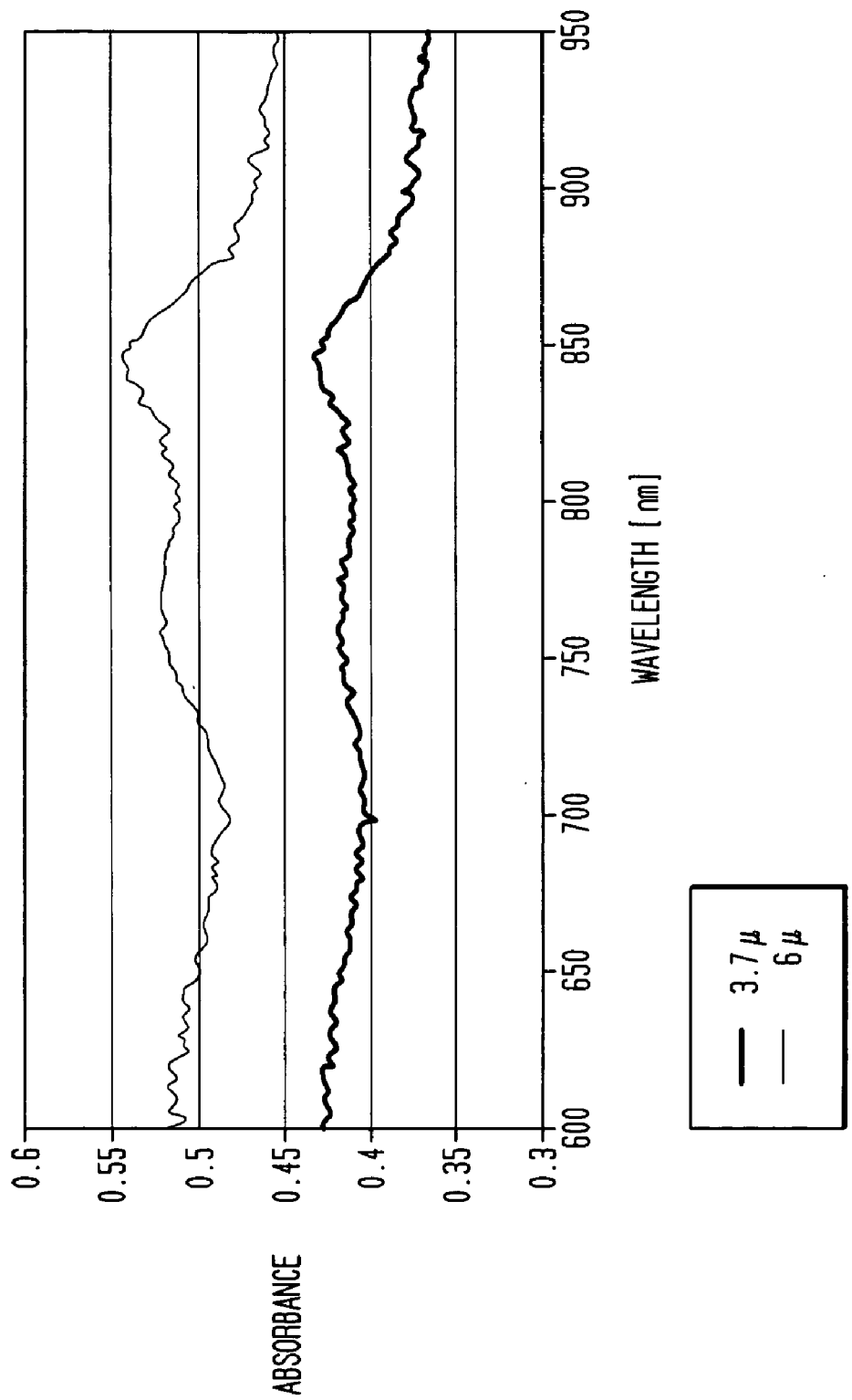
FIG. 6 is an absorbance spectra of coated BOPP substrates, which are coated with SDB 4927 dye containing barrier composition of Example 4 (8 weight percent total solids with 20 mg/L of SDB 4927 dye resulting in 35 weight percent of montmorillonite in the dried coating)
Figure 7:
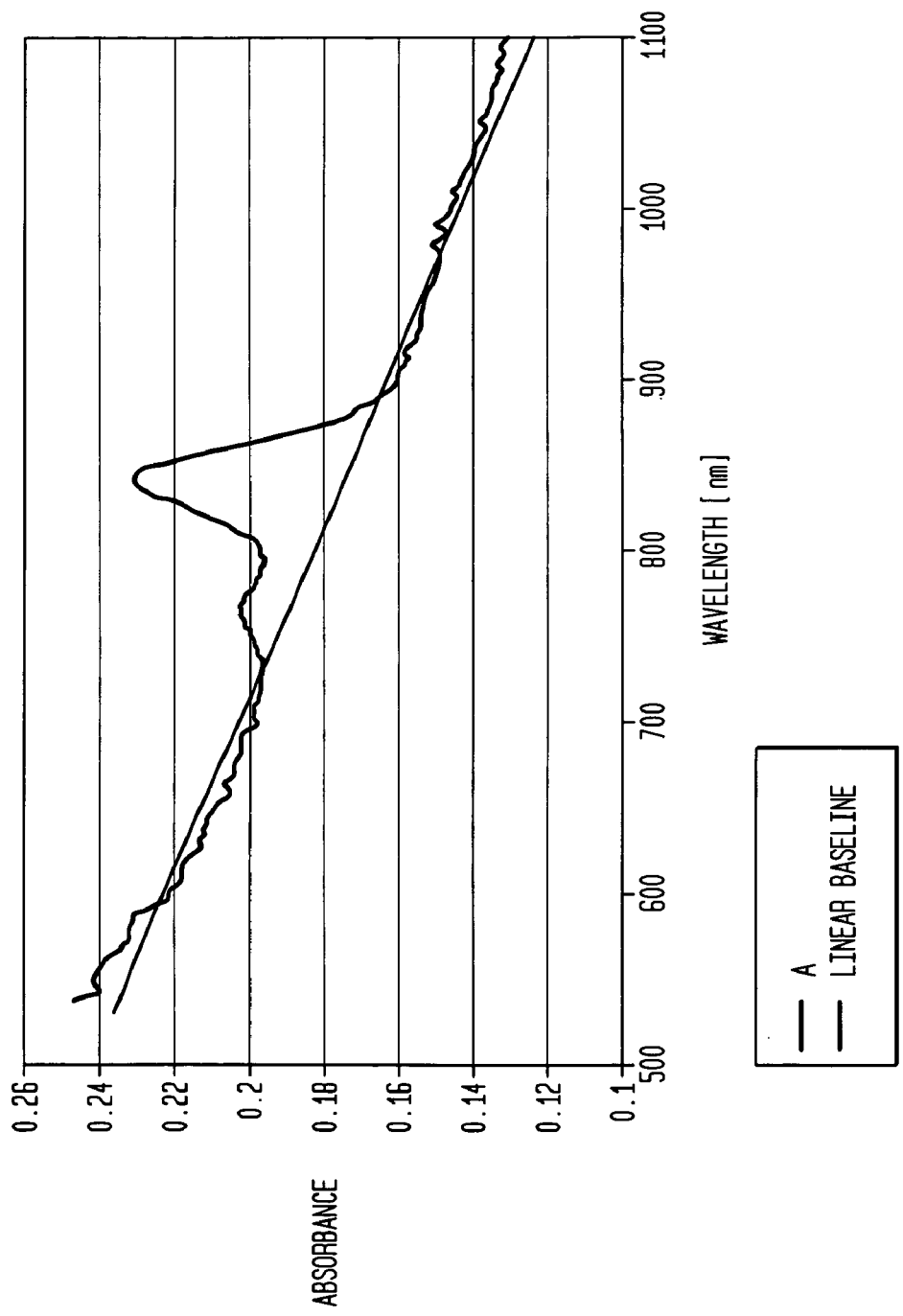
FIG. 7 is an absorbance spectrum of film with a linear baseline, the film was formed from SDB 4927 dye containing barrier composition of Example 5 (8 weight percent total solids with 20 mg/L of SDB 4927 dye resulting in 35 weight percent of montmorillonite in the dried film)

Two different thicknesses of coating (compositions containing SDB 4927 dye at concentrations of 20 mg/L) were casted on BOPP film. Thickness of the films was measured by profilometry method. The absorption spectrum was measured on coated BOPP films as shown in FIG. 6. It is evident from this figure that the nature of the peak remained same for both the film thickness.

Example 5

SDB 4927 Dye Containing Coating Compositions of Example 3C to Correlate Absorbance Spectra with Linear and Polynomial Baseline This Example illustrates how to develop a coating thickness calibration curve in the 2-8 micron thickness range for freshly prepared 5 and 20 mg/L SDB 4927 dye contained in a barrier coating composition similar to Example 3C.

Figure 8:
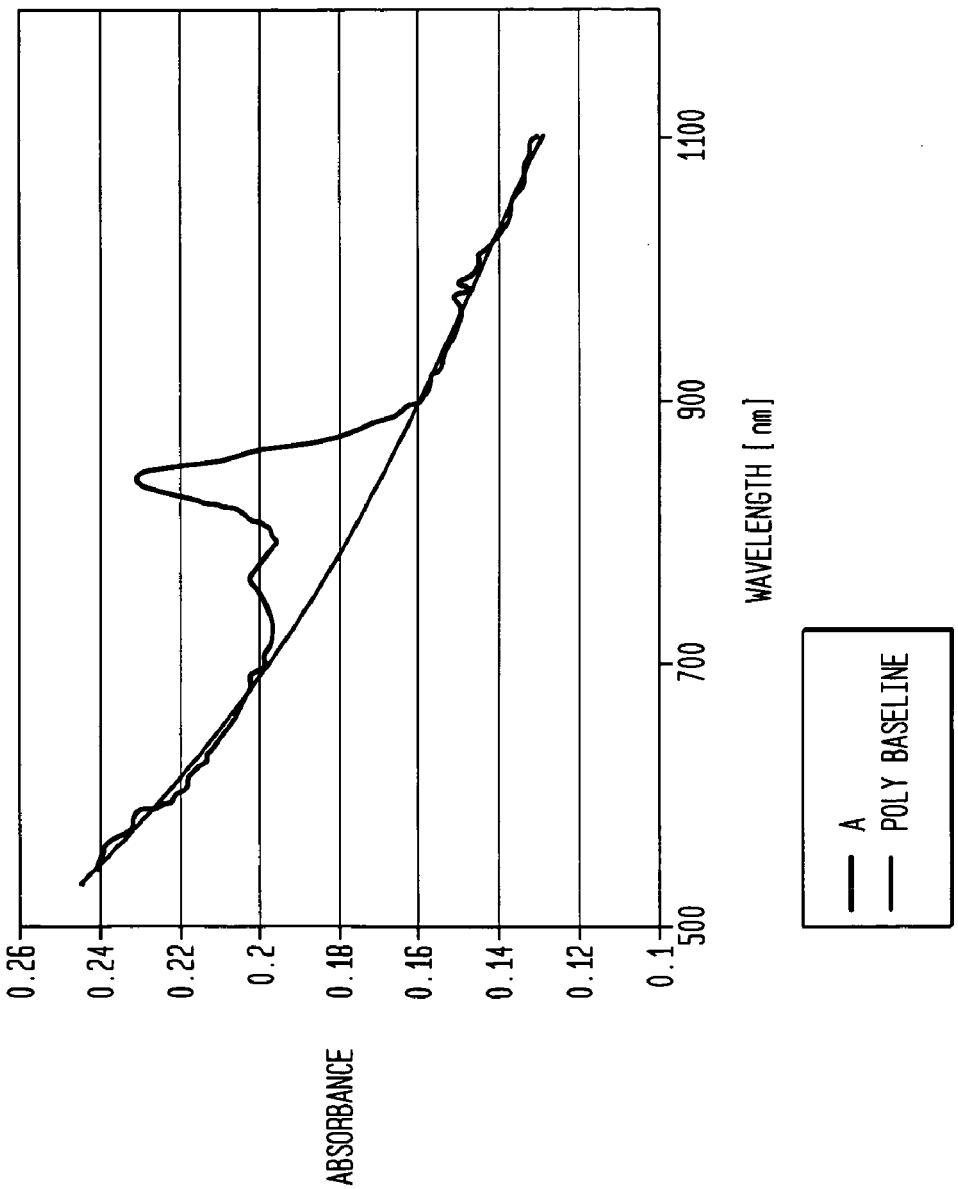
FIG. 8 is an absorbance spectrum of film with a polynomial baseline, the film was formed from SDB 4927 dye containing barrier composition of Example 5 (8 weight percent total solids with 20 mg/L of SDB 4927 dye resulting in 35 weight percent of montmorillonite in the dried film)
Figure 9:
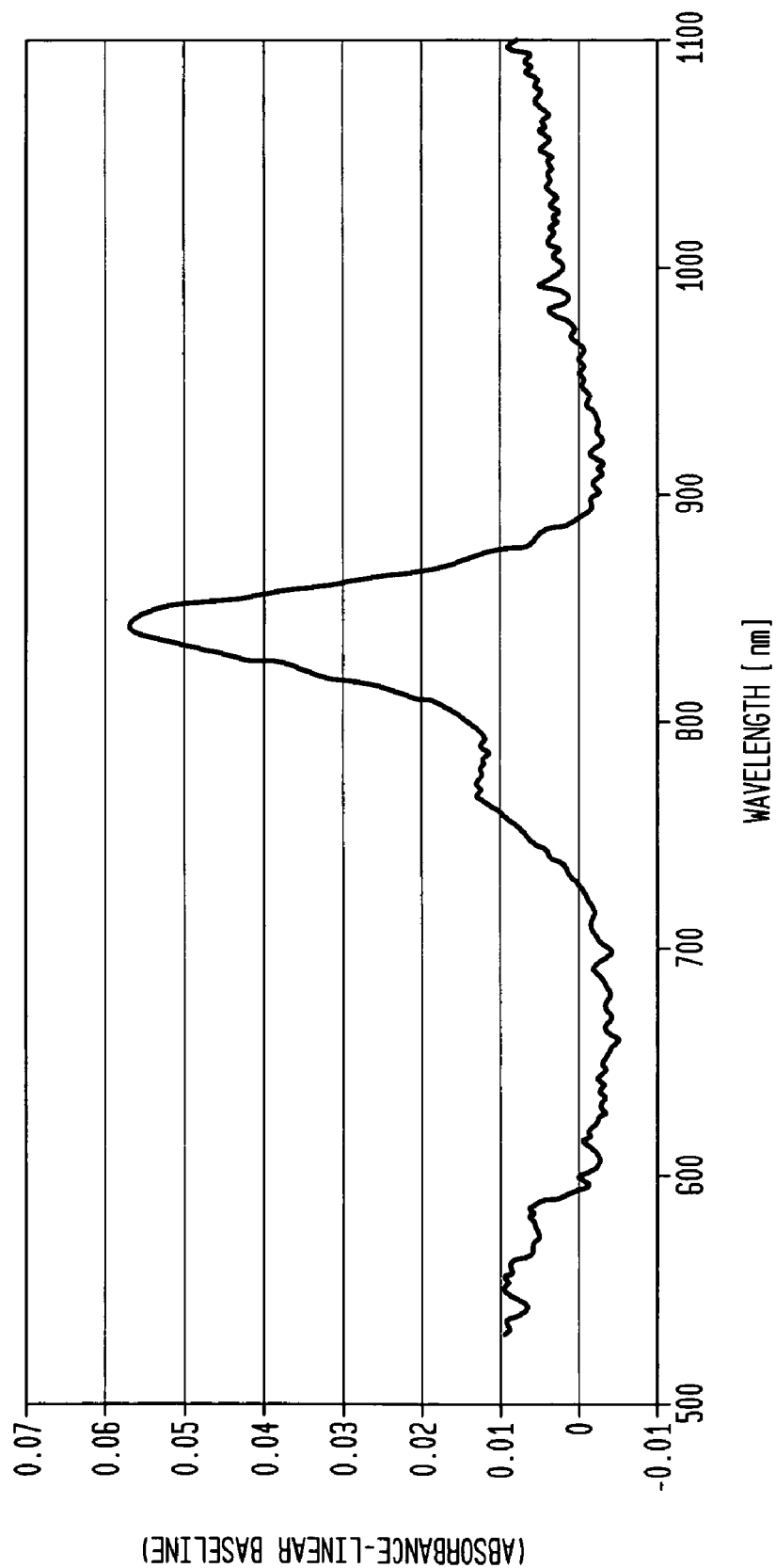
FIG. 9 is a corrected spectrum of FIG. 7 showing linear baseline subtracted absorption spectrum of film ((absorbance—linear baseline) vs. wavelength (nm))
Figure 10:
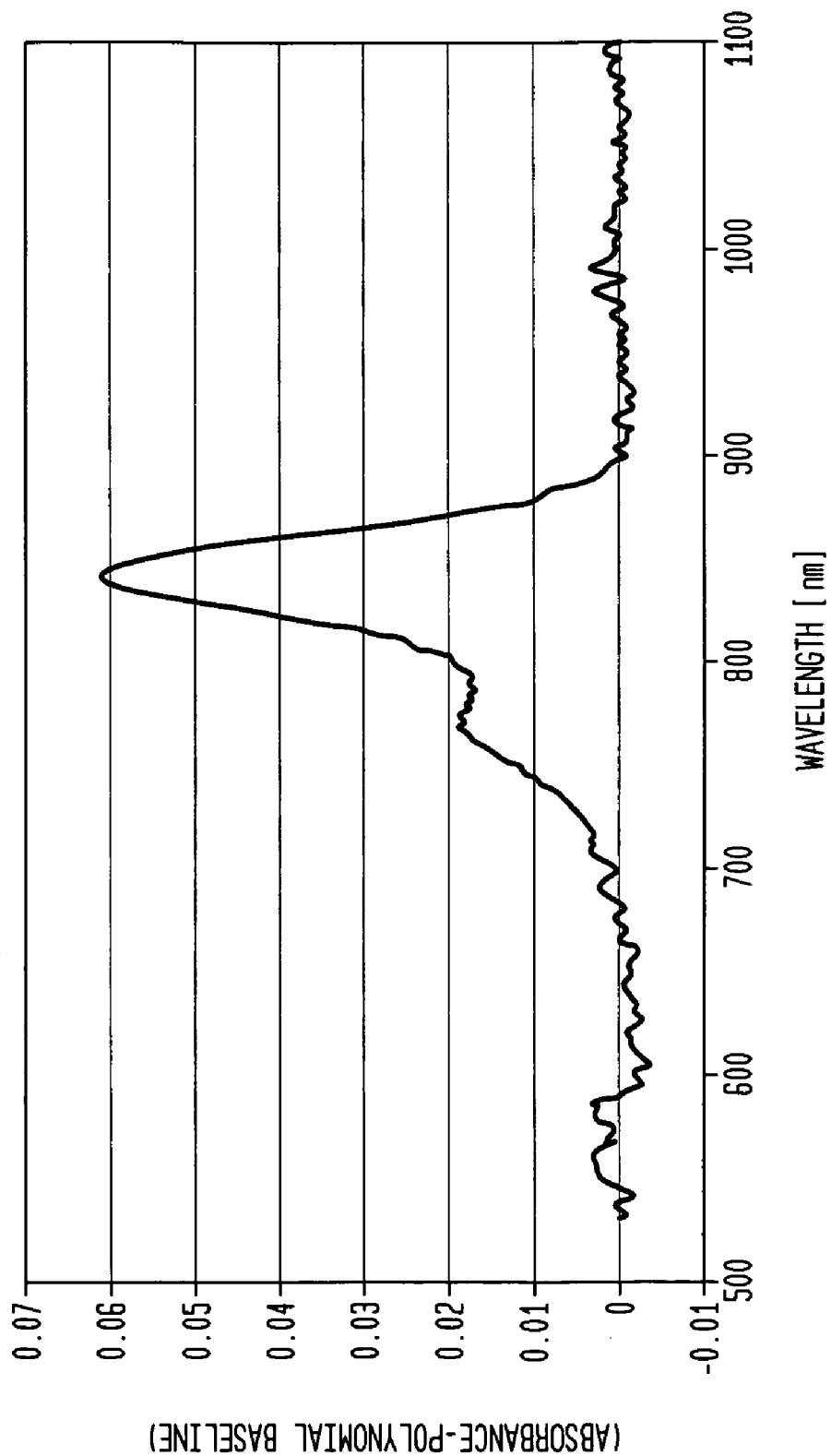
FIG. 10 is a corrected spectrum of FIG. 8 showing polynomial baseline subtracted absorption spectrum of film ((absorbance—polynomial baseline) vs. wavelength (nm))
Figure 11:
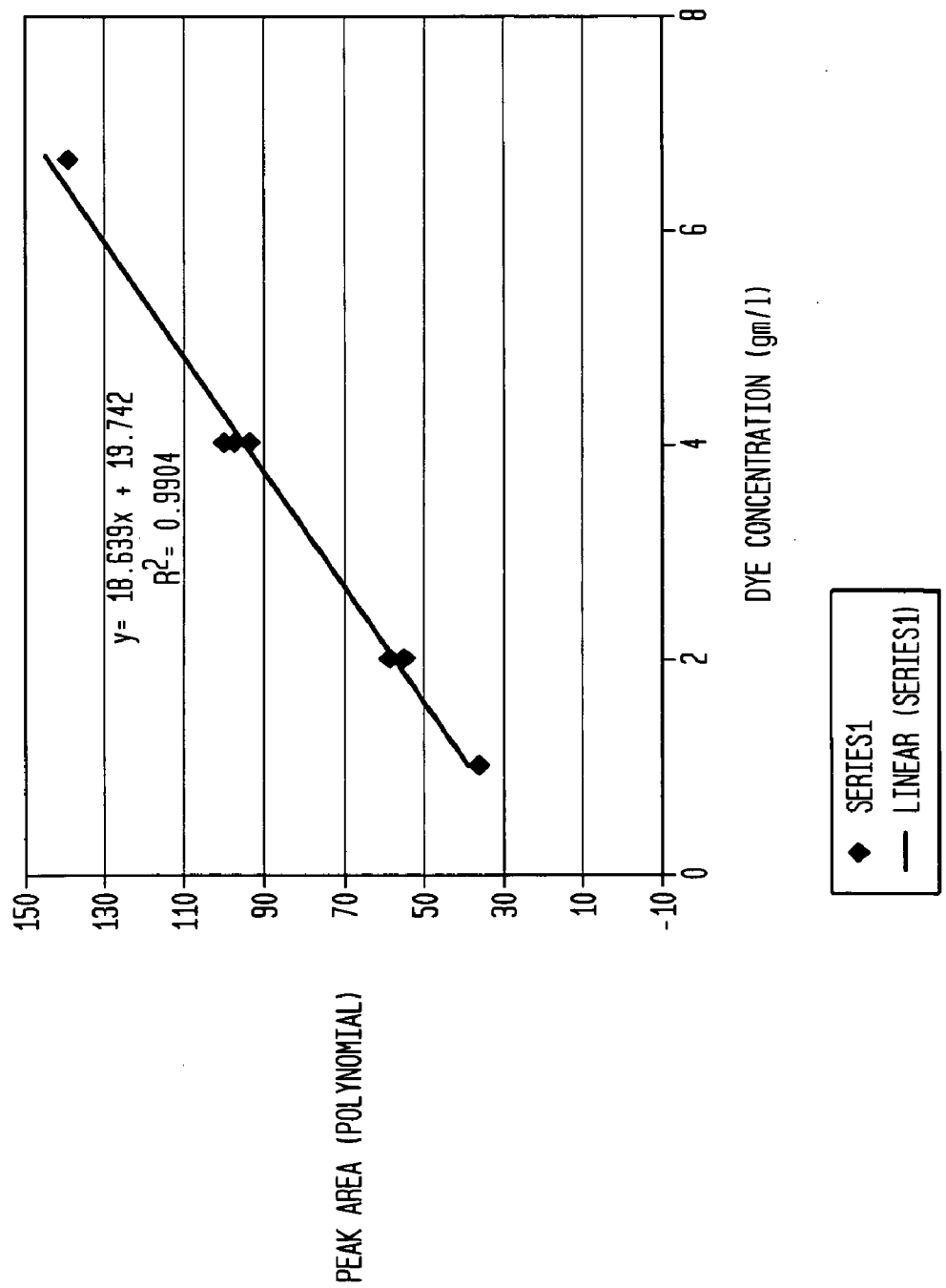
FIG. 11 illustrates a relationship with concentration of SDB 4927 dye in barrier coating composition of Example 5 and the absorbance peak area (i.e., area under the curve (AUC) at 846 nm) using polynomial baseline.

The SDB 4927 dye at a concentration of 20 mg/L in the composition of Example 3C was diluted using de-ionized (DI) water to a variety of concentrations. Absorbance specta were measured for all the concentrations. Peak height and area were determined considering linear and polynomial baseline as shown in FIGS. 7-10 and correlated with dye concentration in formulation. Linear baseline is plotted between the onset and end of the peak. The onset and end of the peak are approximately 720 and 900 nm, respectively. Linear baseline is extrapolated to 500 nm at one end and 1100 nm on the other end. Once linear base line is determined, it is subtracted from absorbance as shown in FIG. 9. For polynomial baseline, the absorbance peak data were deleted (absorbance data from ~720 to ~900 nm) and the remaining data was fitted with third order polynomial. Once polynomial base line is determined, it is subtracted from absorbance as shown in FIG. 8 and area under the peak was determined. FIG. 11 shows the linearity of dye concentration in formulation with absorbance peak area considering the polynomial baseline. It confirms uniform solubility and distribution of dye in formulation.

Example 6

Figure 12:
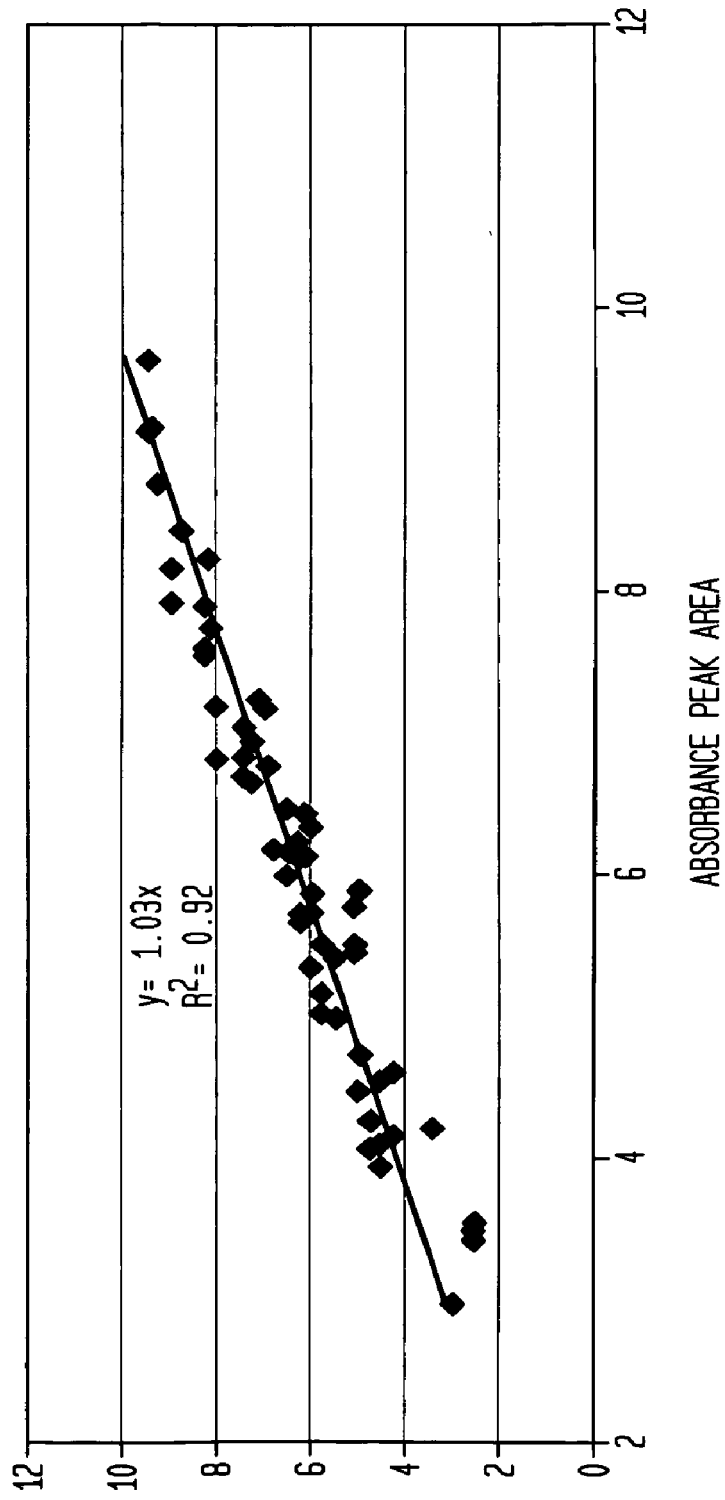
FIG. 12 shows a correlation with thickness and absorbance peak area of coatings on glass slide of Example 6, which used coating compositions as described in Example 5 (concentrated polyester-montmorillonite coating composition with 8 percent total solids containing 20 mg/L SDB 4927 dye, which resulted in 35 weight percent montmorillonite in the dried film)

SDB 4927 Dye Containing Coating Compositions to Correlate Absorbance Spectra and Thickness on Coated Glass Slides Glass slides were coated with SDB 4927 dye at 20 mg/L concentration in the formulation otherwise similar to Example 3C for different dipping times to get a range of thicknesses. Absorbance spectra were measured at different points on the glass slide. Thicknesses were measured using Optical Profilometry. Absorbance spectra and film thickness were measured at the same point within experimental error. The peak area considering polynomial base line showed better correlation with thickness. The peak area was correlated with thickness measured by Profilometry as shown in FIG. 12. As shown in FIG. 12, the peak area of the SDB 4927 dye is linear with thickness of coating.

Example 7

Figure 13:
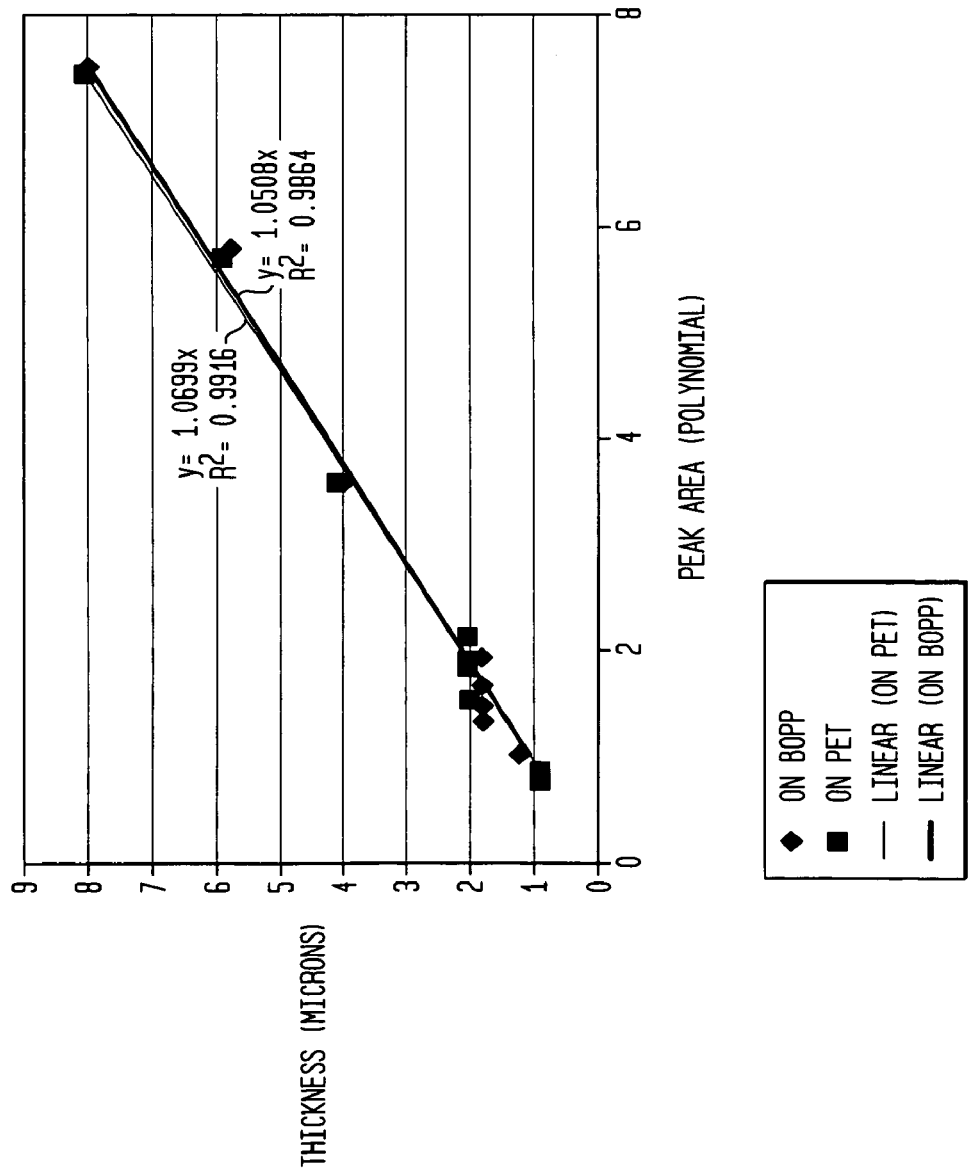
FIG. 13 shows a comparison of thickness vs. absorbance peak area of coatings on BOPP and PET films, which used coating compositions as described in Example 5 (concentrated polyester-montmorillonite coating composition with 8 percent total solids containing 20 mg/L SDB 4927 dye, which resulted in 35 weight percent montmorillonite in the dried film)

SDB 4927 Dye Containing Coating Compositions of Example 3C to Correlate Absorbance Spectra and Thickness on BOPP and PET Films The SDB 4927 dye at 20 mg/L concentration in the coating composition otherwise similar to Example 3C was cast on BOPP and PET and absorbance spectra were measured. The coating thickness measurement was made using optical profilometry. As shown in FIG. 13, peak area of the dye with thickness on the film follows almost the same linearity (1.07 in PET and 1.05 in BOPP substrate) as on glass (1.09).

Example 8

Stability Studies of SDB 4927 Dye Containing Coating Compositions of Example 3C

Figure 14:
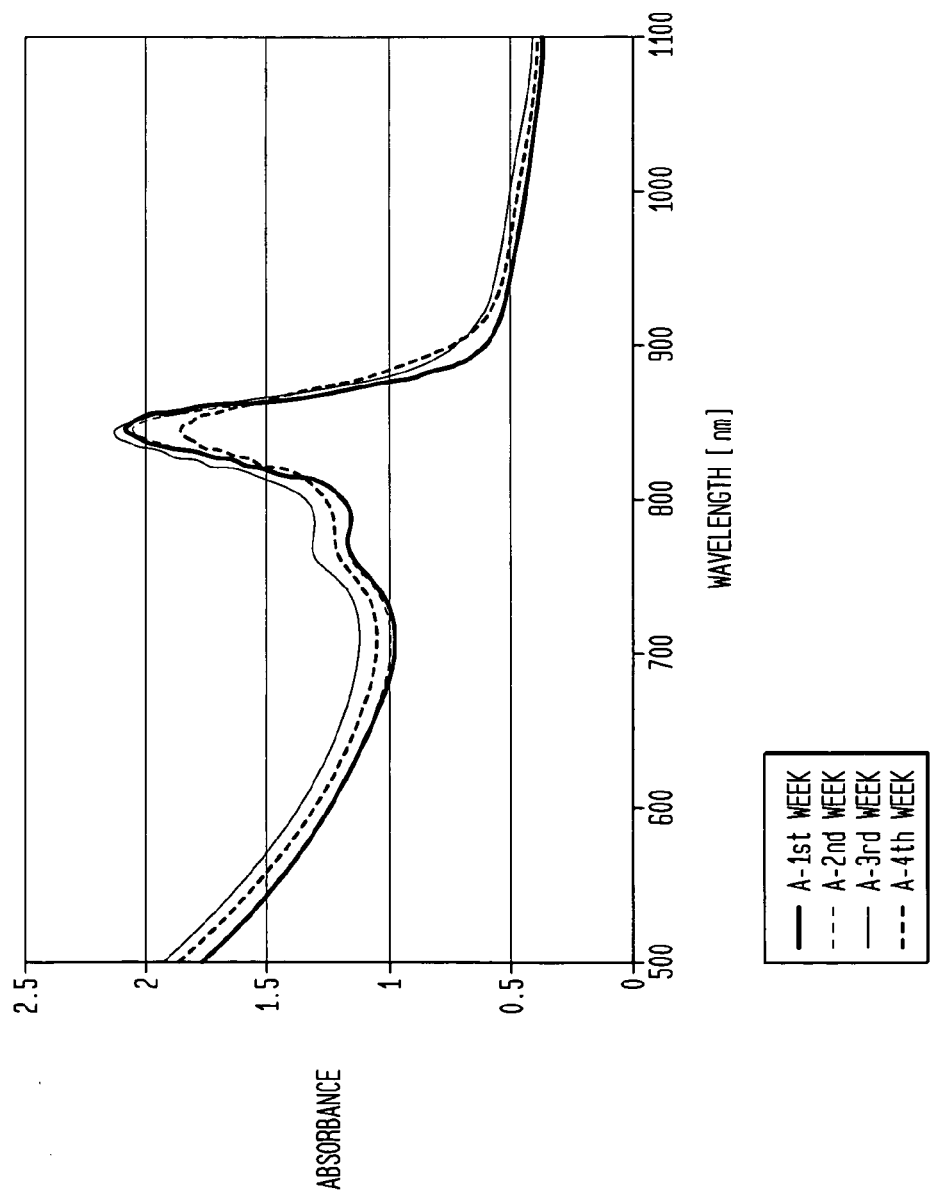
FIG. 14 shows absorption spectra of a diluted dye containing coating composition over time (see Example 8 below for more details)

A formulation containing SDB 4927 dye at 20 mg/L concentration in the coating composition otherwise similar to Example 3C was prepared. Spectra of this formulation diluted with water were measured periodically. The dye appears stable and the absorbance spectrum of dye in formulation has not changed for four weeks. For the same concentration of the dye in formulation, peak area remains the same as evident from FIG. 14. The observed absorbance peak area over time is also summarized in Table 4.

TABLE 4

| Time (week) | Absorbance peak area |
|---|---|
| 0 | 99.2 |
| 1 | 97.7 |
| 2 | 103.0 |
| 3 | 101.0 |
| 4 | 96.9 |
| 6 | 94.6 |
| 8 | 93.2 |
| Std deviation | 3.45 |

Example 9

Thickness Measurement for Thin Films, <1 Micron

The SBD 4927 dye at different concentrations in coating compositions otherwise similar to Example 3C were cast on BOPP substrate film and absorbance spectra were measured and compared. Specifically, the NIR dye SDB 4927 was added to the nanocomposite dispersion to measure the thickness of coating of very thin films (<1μ) using 50 mg/l dye and 20 mg/l dye. For the 50 mg/l dye compositions, the dye was added to the dispersion in a glass bottle and stirred using magnetic stirrer for approximately 7 hrs. at room temperature.

Figure 15:
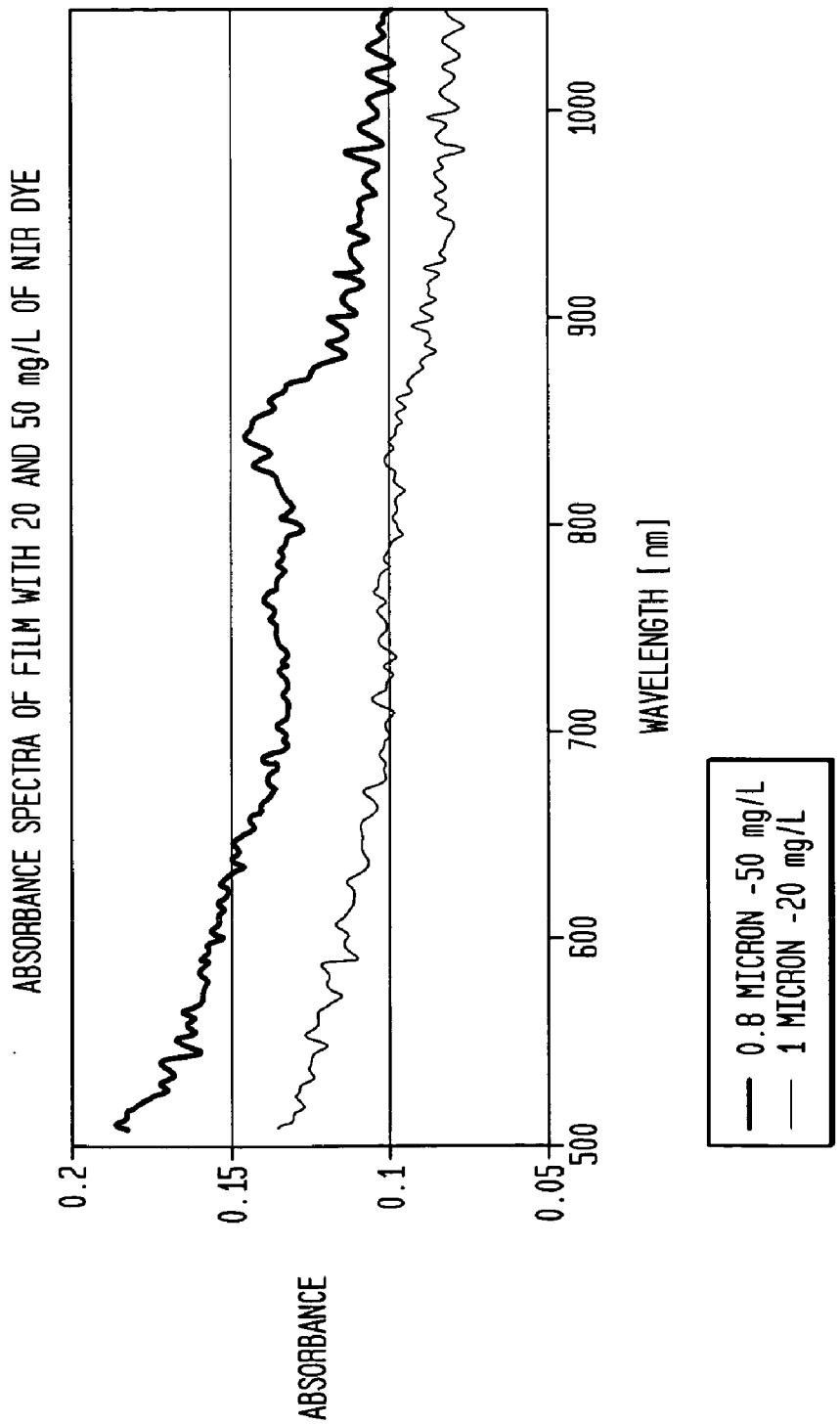
FIG. 15 is a plot of absorbance vs. wavelength in nanometers for a 1 micron thick and a 0.8 thick micron coating.

FIG. 15 shows the comparison of absorbance spectra of films (<1μ). It is clear from FIG. 15 that the peak of NIR dye is much more well defined when the dye concentration was increased from 20 to 50 mg/l.

Figure 16:
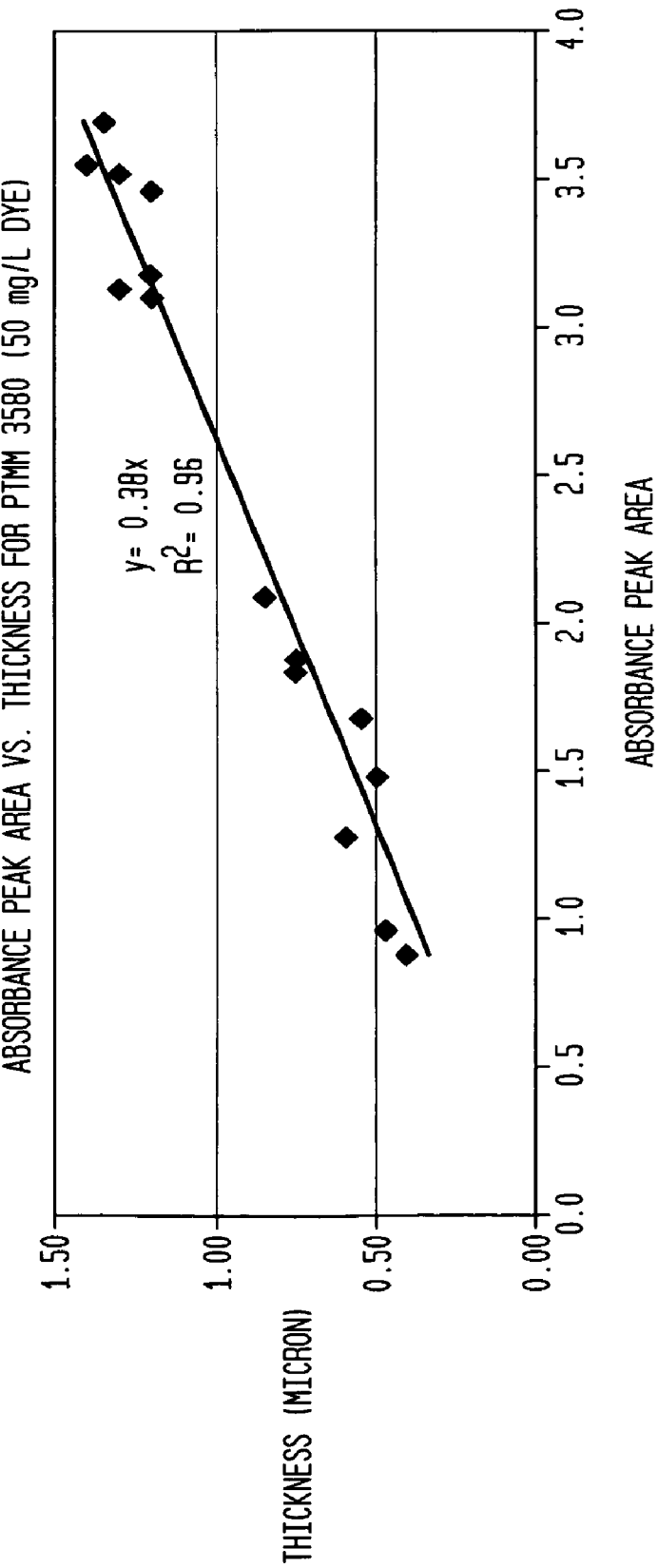
FIG. 16 is a plot of thickness vs. absorbent peak area.
Figure 17:
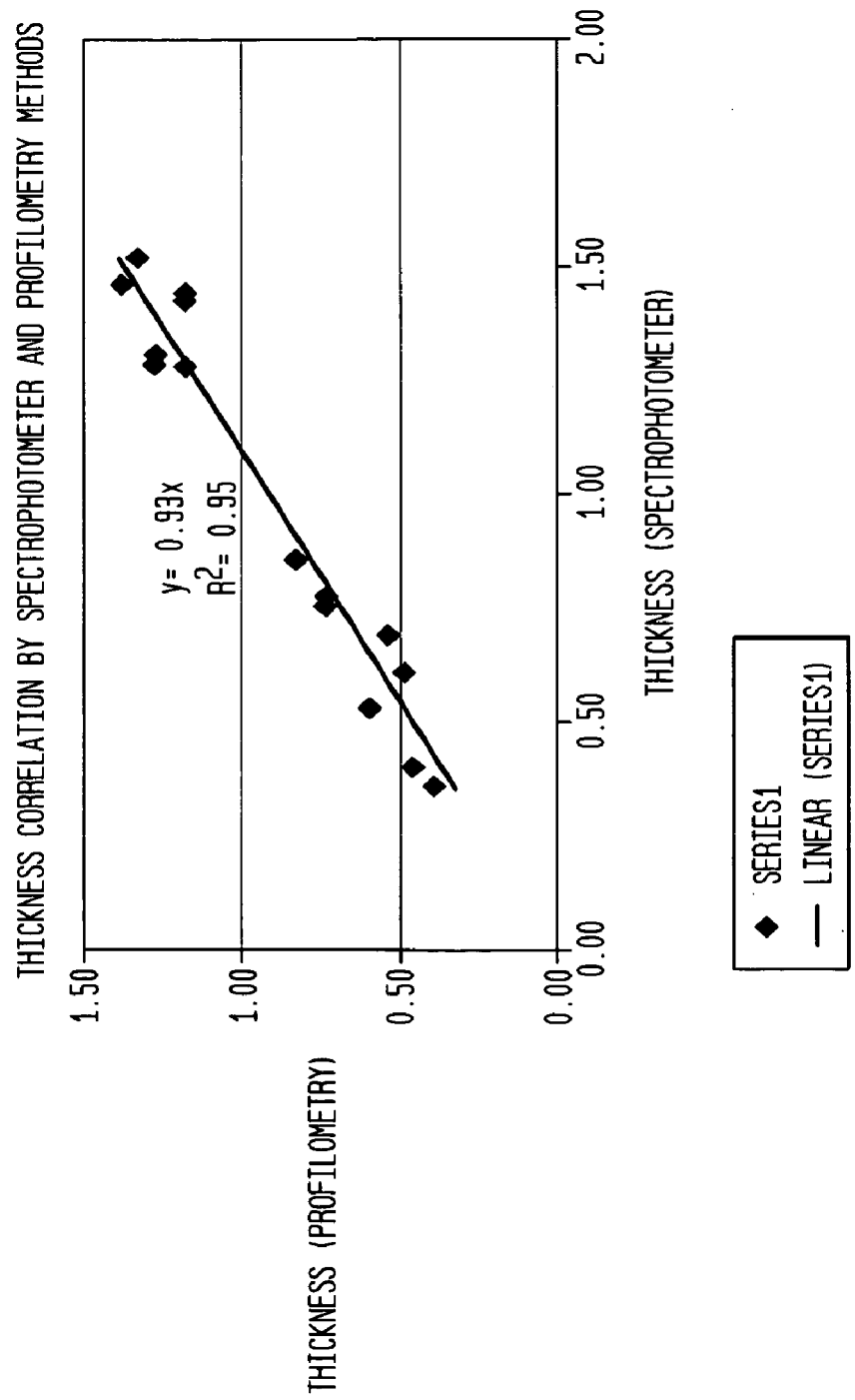
FIG. 17 is a plot of thickness as measured by profilometry vs. thickness determined by a spectral photometer in accordance with the invention.

Absorbance spectra were measured at different points on the film along with thicknesses using optical profilometry. Absorbance spectra and film thickness were measured at the same point within error. The peak area was correlated with thickness measured by profilometry as shown in FIG. 16. It is seen in FIG. 16 that the peak area of the dye is linear with thickness of coating, much the same as our previous results of coating on glass slide with 20 mg/l dye in thicker films. If we correlate the slope of absorbance peak area vs. thickness (profilometry) for two different concentrations of dye (20 and 50 mg/l), and scale to 20 mg/l, they are determined to be about 1 (see FIG. 12, FIG. 13) and 0.95 (=0.38×50/20, FIG. 16), respectively, showing good agreement. So also, the profilometry thickness values correspond to thickness determined by the spectrophotometer method of this invention as is seen in FIG. 17.

It is seen in this Example series that elevated levels of invisible marker dye may be used for thickness measurements of less than 1 micron. In general, the technique may be used to measure thicknesses of thin coatings by increasing the dye concentration in the liquid composite prior to coating to greater than 20 mg/l when thin films are employed. Dye concentrations of greater than 25 mg/l up to 75 mg/l are believed particularly suitable for barrier coating thicknesses of from 0.1-1 microns.

While the invention has been described in connection with several embodiments, modifications of those embodiments within the spirit and scope of the present invention will be readily apparent to those of skill in the art. The invention is defined in the appended claims.

What is claimed is:

1. A nanocomposite dispersion containing an invisible marker dye for forming a transparent barrier coating, said dispersion comprising:
    a) a liquid carrier medium which includes water;
    b) an exfoliated silicate filler material dispersed in the carrier medium;
    c) a matrix polymer which is dispersed in the carrier medium; and
    d) an invisible marker water soluble dye;
    wherein the invisible marker dye exhibits an absorption peak in the infrared region of the electromagnetic spectrum and is present in amounts effective to indicate thickness when the dispersion is made into a dried barrier coating.

2. The nanocomposite dispersion according to claim 1, wherein said dye is present in the dispersion in an amount of at least 5 mg/liter.

3. The nanocomposite dispersion according to claim 1, wherein said dye is present in the dispersion in an amount of at least 5 mg/liter and up to 100 mg/liter.

4. The nanocomposite dispersion according to claim 1, wherein said dye is present in the dispersion in an amount of at least 10 mg/liter and up to 50 mg/liter.

5. The nanocomposite dispersion according to claim 1, wherein a dried barrier coating formed from the dispersion exhibits an at least 25-fold reduction in gas permeability as compared with a coating formed of matrix polymer alone.

6. The nanocomposite dispersion according to claim 1, wherein a dried barrier coating formed from the dispersion exhibits an at least 50-fold reduction in gas permeability as compared with a coating formed of matrix polymer alone.

7. The nanocomposite dispersion according to claim 1, wherein a dried barrier coating formed from the dispersion exhibits an at least 100-fold reduction in gas permeability as compared with a coating formed of matrix polymer alone.

8. The nanocomposite dispersion according to claim 1, wherein a dried barrier coating formed from the dispersion exhibits an at least 500-fold reduction in gas permeability as compared with a coating formed of matrix polymer alone.

9. The nanocomposite dispersion according to claim 1, wherein a dried barrier coating formed from the dispersion exhibits an at least 1000-fold reduction in gas permeability as compared with a coating formed of matrix polymer alone.

10. The nanocomposite dispersion according to claim 1, wherein the exfoliated silicate filler material includes a compound selected from the group consisting of bentonite, vermiculite, montmorillonite, nontronite, beidellite, volkonskoite, hectorite, saponite, laponite, sauconite, magadiite, kenyaite, ledikite, and combinations thereof.

11. The nanocomposite dispersion according to claim 1, wherein the exfoliated silicate filler material includes montmorillonite.

12. The nanocomposite dispersion according to claim 1, wherein the exfoliated silicate filler material includes vermiculite.

13. The nanocomposite dispersion according to claim 1, wherein the exfoliated silicate filler material comprises platelets with an average aspect ratio of at least 50.

14. The nanocomposite dispersion according to claim 1, wherein the exfoliated silicate filler material comprises platelets with an average aspect ratio of at least 1,000.

15. The nanocomposite dispersion according to claim 1, wherein the exfoliated silicate filler material comprises platelets with an average aspect ratio of at least 5,000.

16. The nanocomposite dispersion according to claim 1, wherein the matrix polymer includes a polymer selected from the group consisting of polyesters, polyamides, chlorinated polymers, polyolefins, polyurethanes, polyethers, polyketones, polycarbonates, acrylics, vinylics, fluoropolymers, and combinations thereof.

17. The nanocomposite dispersion according to claim 1, wherein the matrix polymer includes a polyester resin.

18. The nanocomposite dispersion according to claim 1, wherein the matrix polymer includes a sulfonated polyester resin.

19. The nanocomposite dispersion according to claim 1, wherein the invisible marker dye has an absorption peak in the near infrared (NIR) region of the electromagnetic spectrum.

20. The nanocomposite dispersion according to claim 1, wherein the invisible marker dye has an absorption peak in the region of greater than about 700 nm to about 1200 nm.

21. The nanocomposite dispersion according to claim 1, wherein the invisible marker dye has an absorption peak in the region of about 750 nm to about 1000 nm.

22. The nanocomposite dispersion according to claim 1, wherein the invisible marker dye has an absorption peak in the region of about 750 nm to about 850 nm.

23. The nanocomposite dispersion according to claim 1, wherein the invisible marker dye is an NIR dye having an absorption maximum at a wavelength selected from the group consisting of: 910 nm; 864 nm; 844 nm; 824 nm; 820 nm; 819 nm; 807 nm; 783 nm and 782 nm.

24. The nanocomposite dispersion according to claim 1, wherein the invisible marker dye is an NIR dye having an absorption maximum at a wavelength selected from the group consisting of 844 nm and 820 nm.

25. The nanocomposite dispersion according to claim 1, wherein the dispersion further includes at least one adjuvant selected from the group consisting of surfactants, anti-foaming agents, dispersing agents, wetting agents, leveling agents and thickeners.

26. A dried nanocomposite barrier coating having a thickness of from 1 to 10 microns containing an invisible marker dye which is prepared by forming a film from the nanocomposite dispersion according to claim 1.

27. The nanocomposite barrier coating according to claim 26, wherein the coating exhibits an oxygen permeability of less than 0.02 cc-mm/m$^2$-day-atm.

28. The nanocomposite barrier coating according to claim 26, wherein the coating exhibits an oxygen permeability of less than 0.01 cc-mm/m$^2$-day-atm.

29. The new composite barrier coating according to claim 26, adhered to a polymeric substrate.

30. The nanocomposite barrier coating according to claim 26, adhered to a cellulosic substrate.

31. The nanocomposite barrier coating according to claim 26, adhered to a polyolefin substrate.

32. The nanocomposite barrier coating according to claim 26, adhered to a polyester substrate.

33. A nanocomposite dispersion containing an invisible marker dye for forming a transparent barrier coating, said dispersion comprising:
  a) a liquid carrier medium which includes water;
  b) an exfoliated silicate filler material dispersed in the carrier medium, wherein said exfoliated filler material comprises platelets with an average aspect ratio of at least 5,000 and up to 30,000;
  c) a non-elastomeric matrix polymer which is dispersed in the carrier medium; and
  d) an invisible marker water soluble dye;
  wherein the invisible marker dye exhibits an absorption peak in the infrared region of the electromagnetic spectrum and is present in amounts effective to indicate thickness when the dispersion is made into a dried barrier coating.

34. The nanocomposite dispersion according to claim 33, wherein said dye is present in the dispersion in an amount of at least 5 mg/liter.

35. The nanocomposite dispersion according to claim 33, wherein said barrier coating exhibits an at least 25-fold reduction in gas permeability as compared with a coating formed of matrix polymer alone.

36. The nanocomposite dispersion according to claim 33, wherein the exfoliated silicate filler material includes a compound selected from the group consisting of bentonite, vermiculite, montmorillonite, nontronite, beidellite, volkonskoite, hectorite, saponite, laponite, sauconite, magadiite, kenyaite, ledikite, and combinations thereof.

37. The nanocomposite dispersion according to claim 33, wherein the matrix polymer includes a polymer selected from the group consisting of polyesters, polyamides, chlorinated polymers, polyolefins, polyurethanes, polyethers, polyketones, polycarbonates, acrylics, vinylics, fluoropolymers, and combinations thereof.

38. The nanocomposite dispersion according to claim 33, wherein the invisible marker dye has an absorption peak in the region of greater than about 700 nm to about 1200 nm.

39. The nanocomposite dispersion according to claim 33, wherein the invisible marker dye is an NIR dye having an absorption maximum at a wavelength selected from the group consisting of: 910 nm; 864 nm; 844 nm; 824 nm; 820 nm; 819 nm; 807 nm; 783 nm and 782 nm.

40. A dried nanocomposite barrier coating having a thickness of from 1 to 10 microns containing an invisible marker dye which is prepared by forming a film from the nanocomposite dispersion according to claim 33.

41. The nanocomposite barrier coating according to claim 40, adhered to a polymeric substrate.

* * * * *